(12) United States Patent
Jain et al.

(10) Patent No.: US 11,747,142 B2
(45) Date of Patent: Sep. 5, 2023

(54) INERTIAL NAVIGATION SYSTEM CAPABLE OF DEAD RECKONING IN VEHICLES

(71) Applicants: STMICROELECTRONICS, INC., Coppell, TX (US); STMICROELECTRONICS S.r.l., Agrate Brianza (IT)

(72) Inventors: Mahaveer Jain, Santa Clara, CA (US); Mahesh Chowdhary, San Jose, CA (US); Roberto Mura, Gallarate (IT); Nicola Matteo Palella, Rivolta d'Adda (IT); Leonardo Colombo, Lecco (IT)

(73) Assignees: STMICROELECTRONICS, INC., Coppell, TX (US); STMICROELECTRONICS S.r.l., Agrate Brianza (IT)

(*) Notice: Subject to any disclaimer, the term of this patent is extended or adjusted under 35 U.S.C. 154(b) by 611 days.

(21) Appl. No.: 16/399,842

(22) Filed: Apr. 30, 2019

(65) Prior Publication Data
US 2020/0348137 A1 Nov. 5, 2020

(51) Int. Cl.
*G01C 21/16* (2006.01)
*G01C 21/20* (2006.01)
*G01S 19/49* (2010.01)

(52) U.S. Cl.
CPC .......... *G01C 21/165* (2013.01); *G01C 21/20* (2013.01); *G01S 19/49* (2013.01)

(58) Field of Classification Search
CPC combination set(s) only.
See application file for complete search history.

(56) References Cited

U.S. PATENT DOCUMENTS

| 6,556,895 | B2 | 4/2003 | Ben-Jaacov et al. |
| 6,763,318 | B1 | 7/2004 | Winter et al. |
| 6,826,478 | B2 | 11/2004 | Riewe et al. |
| 8,510,044 | B2 * | 8/2013 | Watanabe ............... G01S 19/47 701/472 |
| 9,330,471 | B2 | 5/2016 | Venkatraman et al. |

(Continued)

FOREIGN PATENT DOCUMENTS

| WO | 2007/143806 A2 | 12/2007 |
| WO | 2012/158751 A1 | 11/2012 |
| WO | 2018/057304 A1 | 3/2018 |

*Primary Examiner* — Aniss Chad
*Assistant Examiner* — Christopher George Fees
(74) *Attorney, Agent, or Firm* — SEED IP LAW GROUP LLP

(57) ABSTRACT

A device including microelectromechanical systems (MEMS) sensors are used in dead reckoning in conditions where Global Positioning System (GPS) signals or Global Navigation Satellite System (GNSS) signals are lost. The device is capable of tracking the location of the device after the GPS/GNSS signals are lost by using MEMS sensors such as accelerometers and gyroscopes. By calculating a misalignment angle between a forward axis of a sensor frame of the device and a forward axis of a vehicle frame using the data received from the MEMS sensors, the device can accurately calculate the location of a user or the vehicle of the device even without the GPS/GNSS signals. Accordingly, a device capable of tracking the location of the user riding in the vehicle in GPS/GNSS signals absent environment can be provided.

16 Claims, 12 Drawing Sheets

(56) References Cited

U.S. PATENT DOCUMENTS

| | | | |
|---|---|---|---|
| 9,752,879 B2 | 9/2017 | Al-Hamad et al. | |
| 9,766,074 B2 | 9/2017 | Roumeliotis et al. | |
| 9,797,727 B2 | 10/2017 | Georgy et al. | |
| 9,810,549 B2 | 11/2017 | Johnson et al. | |
| 10,371,516 B2 | 8/2019 | Ali et al. | |
| 2009/0254279 A1* | 10/2009 | Han | G01C 21/265 |
| | | | 701/501 |
| 2012/0041702 A1* | 2/2012 | Toda | G01P 21/00 |
| | | | 702/96 |
| 2013/0046505 A1 | 2/2013 | Brunner et al. | |
| 2013/0081442 A1* | 4/2013 | Basir | G01C 25/00 |
| | | | 73/1.38 |
| 2014/0288416 A1 | 9/2014 | Mahoney et al. | |
| 2015/0354951 A1 | 12/2015 | Ali et al. | |
| 2016/0313126 A1 | 10/2016 | Lemarchand et al. | |
| 2017/0234988 A1* | 8/2017 | Jafari | G01C 21/12 |
| | | | 701/1 |
| 2018/0112983 A1 | 4/2018 | Ahmed et al. | |
| 2018/0188032 A1 | 7/2018 | Ramanandan et al. | |
| 2018/0259350 A1* | 9/2018 | Ai-Hamad | G01S 19/42 |
| 2020/0141733 A1 | 5/2020 | Ludwig | |
| 2020/0218905 A1 | 7/2020 | Wang et al. | |
| 2020/0272816 A1 | 8/2020 | Endres et al. | |

\* cited by examiner

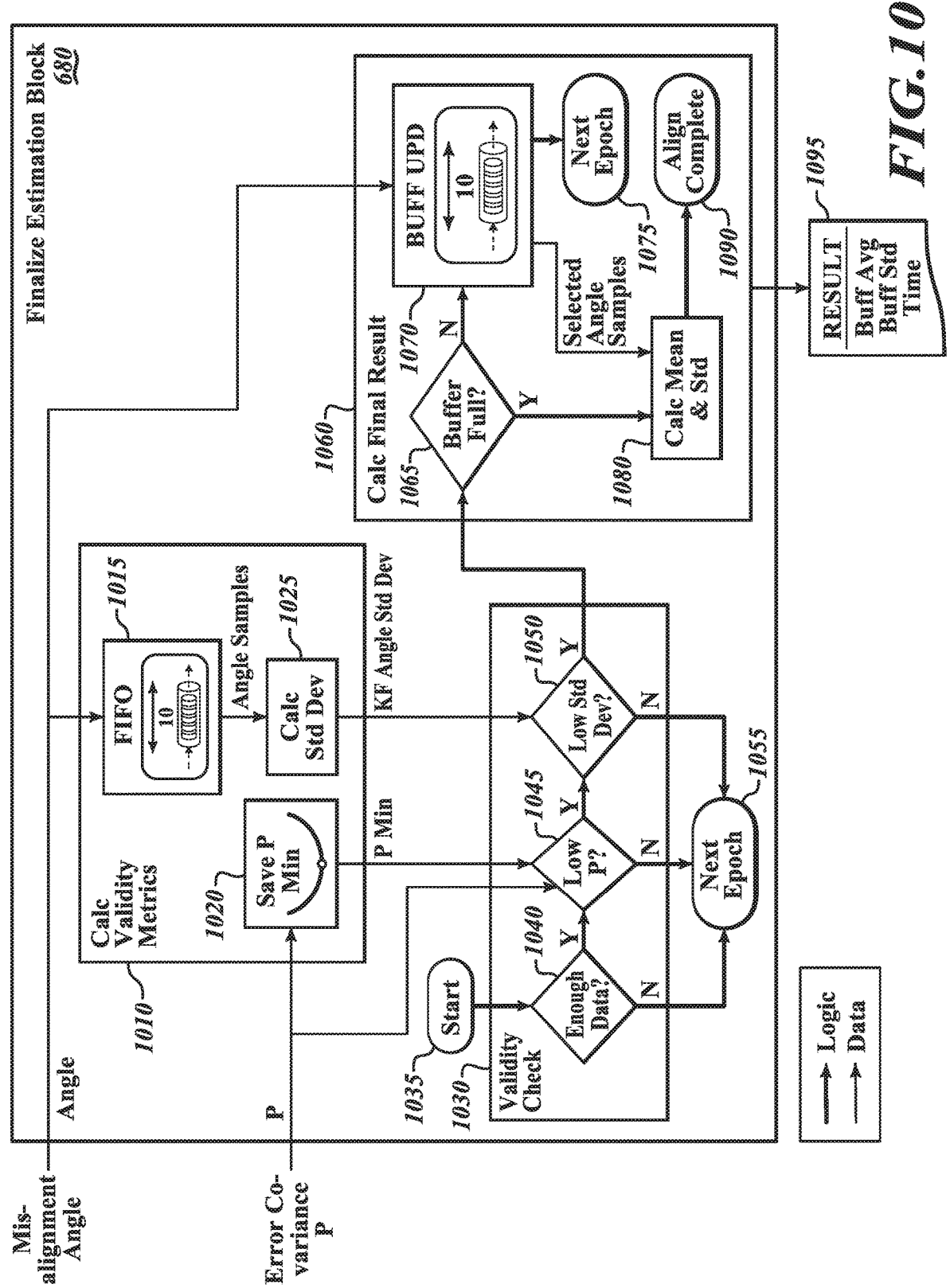

INERTIAL NAVIGATION SYSTEM CAPABLE OF DEAD RECKONING IN VEHICLES

BACKGROUND

Technical Field

The present disclosure relates to vehicle dead reckoning using microelectromechanical systems (MEMS) sensors in a stand-alone electronic device.

Description of the Related Art

As electronic devices become more ubiquitous, users' expectations continue to expand. Many users regularly use the location based applications, such as a map application available on current devices, such as cell phones, tablets, navigation devices and infotainment systems installed in vehicles. These location based services are used by both drivers and riders in ride share applications. The drivers use location based services on their mobile devices, sometimes also integrating with location based applications associated with the driver's vehicle. The riders use location based services on their mobile devices from which they are requesting a ride.

The mobile devices and vehicles include a variety of the following components to aid in the location identification of the driver and rider: MEMS sensors, Global Positioning System (GPS) sensors, Global Navigation Satellite System (GNSS) sensors, among others. For example, the MEMS sensor include, among others, accelerometers and gyroscopes. Accelerometers are used in measuring the acceleration forces or rate of change of velocity. Gyroscopes are used in measuring angular velocity. The mobile devices and vehicles, alone or in combination, display the user's position in space on a location based on a display screen. Through these ride share applications, the driver's location can be shared with the rider and the rider's location can be shared with the driver.

However, when either of these users enters into a place where GPS/GNSS signals are weak, disturbed, or unavailable, the location of the user as detected with the device becomes inaccurate or unavailable and can be displayed inaccurately on the other user's device. As such, the device no longer accurately locates the position of the user. In addition, the conventional dead reckoning method of calculating the current position by using a previously determined position (e.g., by using GPS/GNSS sensors) and advancing that position based estimated speeds is not accurate enough.

BRIEF SUMMARY

Due to these short comings in the location based applications and the dead reckoning methods, an improved device and method of accurately analyzing a location of the user is provided, which is especially beneficial when GPS/GNSS signals are not strong enough or unavailable.

The present disclosure provides a method and system to accommodate circumstances when a user is desirous of accurate location information, but does not have a clear path to receive satellite signals, such as GNSS and GPS signals. These dead zones for GPS or GNSS signals are sometimes referred to as urban canyons, where tall buildings and other obstructions prevent consistent or strong signals.

The device includes sensors, a wireless transmitter/receiver, and a processor for gathering, processing, and transmitting data about the device and the environment in which the device is located. The device is typically simpler than a mobile phone, such that it can be made cost effectively and bolster the capabilities of the mobile phone or a vehicle when in parking garages, urban canyons, or tunnels.

One application of the present disclosure may be beneficial for ride hailing services, which are services that use online-enabled platforms to connect between passengers (riders) and local drivers using their personal vehicles. Examples of ride hailing services include Uber and Lyft. However, when GPS/GNSS signals are degraded or lost, riders trying to use these ride hailing services lose location of the driver's vehicle making pick up more challenging. By utilizing the device, even in environments where GPS/GNSS signals are lost or weak, the driver of the vehicle, and the rider will more effectively locate the location of the vehicle.

Another application of the present disclosure may be beneficial for analyzing collisions between vehicles. The application can be applied to both autonomous and human-operated vehicles. The device, being removeable, but fixed to the vehicle can assist in determining a trajectory of the vehicle based on the sensor alignment methods described. Proper sensor alignment between the device and the vehicle, will give useful information such as impact of crash, direction of impact, etc. when analyzing crashes. The device, with the sensor alignment methods, can provide direction of the related vehicle even in circumstances where the GPS/GNSS signals are degraded or lost. Once a collision has taken place, the aligned sensor data can be used to analyze the collision, including the time right before the collision and impact related data (post collision data).

In particular, the disclosure provides a method for determining a misalignment angle between a vehicle reference frame and a device reference frame, the device being removably attached to the vehicle. The sensors in the electronic device provide data capable of determining the misalignment angle according to the movement of the vehicle using sensors such as accelerometers and gyroscopes.

BRIEF DESCRIPTION OF THE SEVERAL VIEWS OF THE DRAWINGS

For a better understanding of the embodiments, reference will now be made by way of example only to the accompanying drawings. In the drawings, identical reference numbers identify similar elements or acts. The sizes and relative positions of elements in the drawings are not necessarily drawn to scale. For example, the shapes of various elements and angles are not necessarily drawn to scale, and some of these elements may be enlarged and positioned to improve drawing legibility. Further, the particular shapes of the elements as drawn are not necessarily intended to convey any information regarding the actual shape of the particular elements, and may have been solely selected for ease of recognition in the drawings.

FIG. 10 is a flow diagram of a finalize estimation block according to another embodiment of the present disclosure.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known algorithms or methods associated with dead reckoning have not been shown or described in detail to avoid unnecessarily obscuring descriptions of the embodiments.

Unless the context indicates otherwise, throughout the specification and claims which follow, the word "comprise" and variations thereof, such as, "comprises" and "comprising" are to be construed in an open, inclusive sense that is as "including, but not limited to." Further, the terms "first," "second," and similar indicators of the sequence are to be construed as interchangeable unless the context clearly dictates otherwise.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense that is as meaning "and/or" unless the content clearly dictates otherwise.

Figure 1A:
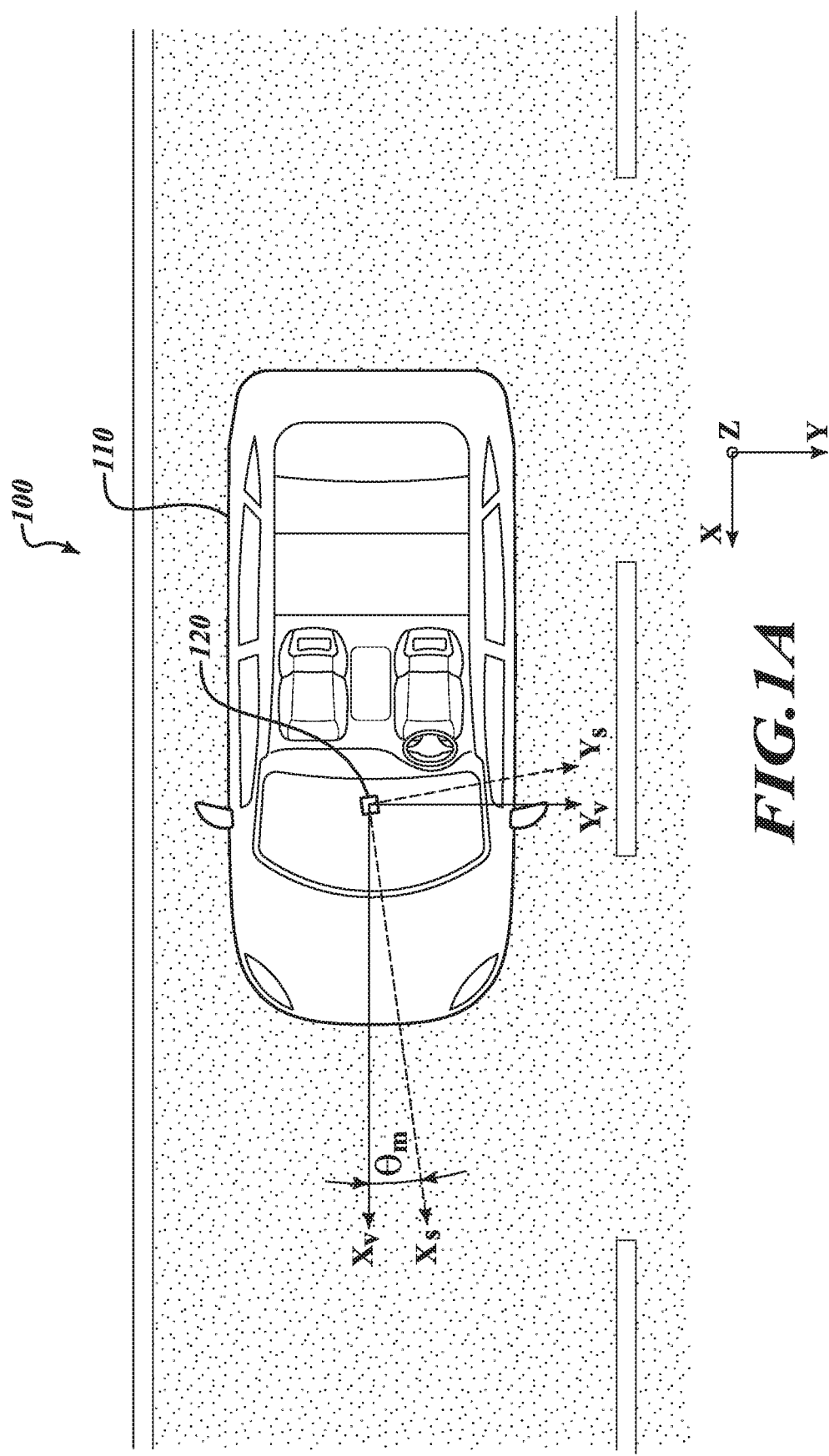
FIG. 1A is a top view of a roadway that includes a misalignment angle $\theta_m$ between a vehicle and a device positioned in a random, temporarily fixed location in the vehicle according to an exemplary embodiment of the present disclosure.

FIG. 1A is a top view 100 of a vehicle 110 on a roadway. A device 120 is position within the vehicle 110. The device may be resting in a location in the vehicle, such as on a seat, on the dashboard, or in a center console of the vehicle 110. While the device 120 is not fixed to a certain location with respect to the car, it can be positioned any place in or on vehicle 110. In this regard, a relationship of the orientation of the device 120 with respect to the fixed three dimensional Cartesian coordinate system (XYZ axis or vehicle reference frame) of the vehicle may be fluid until it is fixed on a certain location in the vehicle. In some embodiments, the device 120, similar to a conventional, embedded vehicle navigation system, such that the device be provided in a permanently or temporarily fixed manner.

Figure 11B:
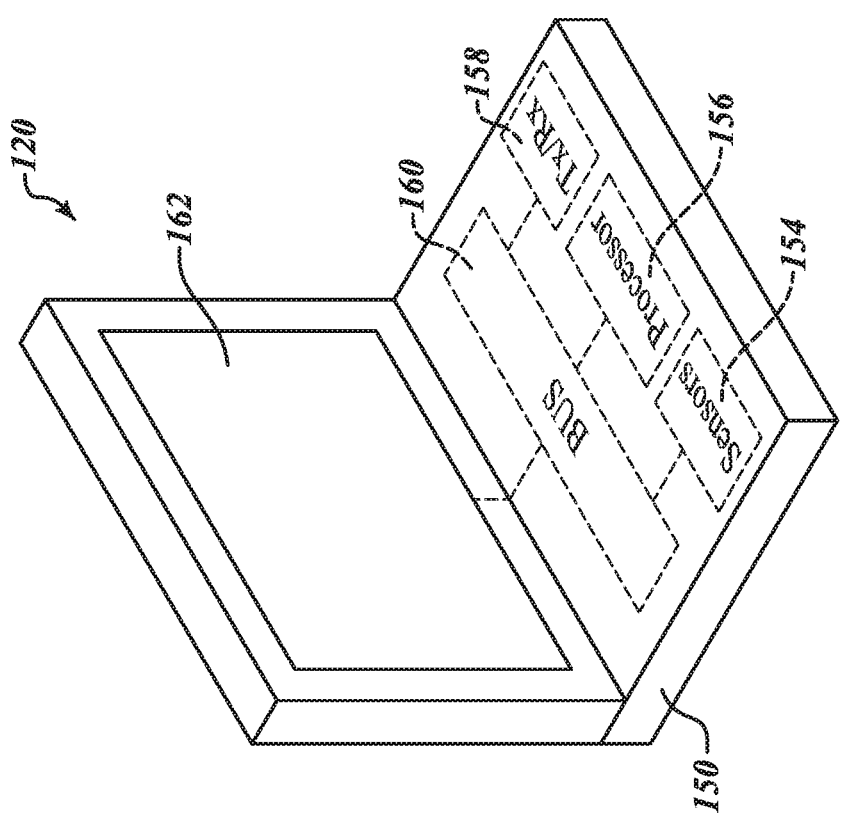
FIG. 11A and FIG. 11B are front and back perspective views of a location identification device of the present disclosure.
Figure 11A:
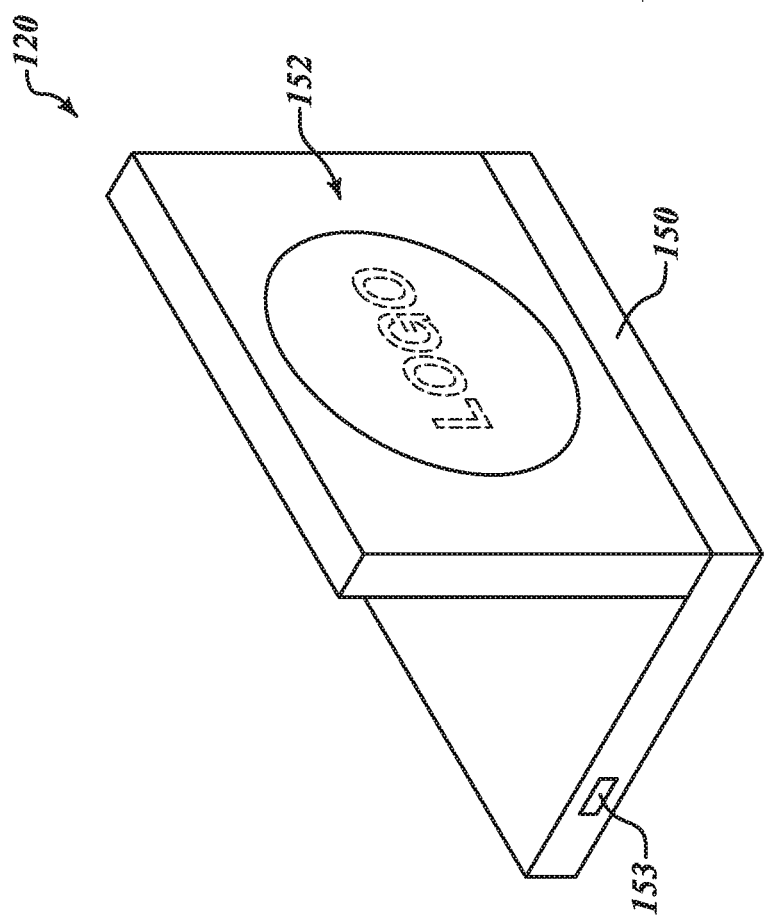

The device 120, for example the device 120 in FIGS. 11A and 11B, can be a standalone device that rests on a dashboard or other temporarily fixed location of the vehicle. This device can be used by drivers of ride share services to increase the accuracy of their location information to be shared with riders and with the service. This device 120 includes a base 150 that may be flexible to conform to and grip to a surface of the dashboard. In other embodiments, this base may include a clip or other attachment to hold the device in place while driving.

The device includes a front panel 152 on which a logo can be displayed. This device includes an illumination device, such as light emitting diodes to illuminate the panel. Alternatively, this panel 152 may be a digital screen such that the displayed image can be changed. For example, during a surge pricing time, this displayed image could be a different color or shape to inform riders of a surge time period. The service could activate all devices 120 in a variety of vehicle within an area with the same surge time period symbol.

The device includes a plurality of sensors 154, a processor 156, a transmitter/receiver device 158, and a bus or data line 160 that couples the plurality of sensors to the processor and the transmitter/receiver 158. The plurality of sensors can includes GPS/GNSS sensors, accelerometers, and gyroscopes. The gyroscopes may have a smaller dynamic range that gyroscopes included in mobile devices, such as phones. These sensors are fixed with respect to a body of the device 120. Once positioned in the car, the sensors are then fixed with respect to a vehicle reference frame. The processor can be an application specific integrated circuit or standard data processing chip that includes memory and logic. The transmitter/receiver may include a variety of transmitting and receiving means, such as WIFI™, Bluetooth™, satellite, and other electronic, wireless communication techniques.

In some embodiments, the device 120 includes a display 162, which may be a touch screen display such that the device 120 can be the electronic computing device that provides the ride sharing application interface to the driver, with or without connection to the driver's personal mobile device.

The device includes a power connection 153 in FIG. 11A on a side of the device 120. This can be any type of suitable connector to charge a battery (not shown).

The device has a sensor reference frame that is fixed with respect to the device 120, but can change with respect to the vehicle reference frame as the device is moved to a different position in the vehicle or moved to another vehicle. As such, a misalignment angle $\theta_m$ between the vehicle 110 and the device 120 positioned in a random location in the vehicle 110 is calculated in real time, based on the most recent location of the device with respect to the vehicle. For example, the device 120 may be coupled to a holder in the vehicle 110, such as an adjustable arm coupled to the dashboard, the misalignment angle may be calculated based on this location with respect to the vehicle. The system described in this disclosure will regularly determine if a position of the device has changed since the last check. Different actions are taken depending on whether the position has changed.

The device and methods described in this disclosure provide more accurate location information to identify a location of the device with respect to a map in a location based application. For example, a police officer at the scene of an accident waiting for an ambulance that is traveling through low GPS signal environments will be able to accurately track a position of the ambulance that includes the device 120 as the device 120 can calculate location information from the sensors in the device. The location information can be shared through an emergency department's application, through the cloud, or through other wireless services, like cellular networks from the ambulance to the police officer. The officer's location can also be shared to the ambulance to give each party accurate location information.

In this example arrangement, the vehicle 110 is moving in a first direction. In a navigation perspective, a heading of the vehicle is the direction in which the vehicle is pointing and moving towards, i.e., to the left in the Figure. For example, the first direction may be a heading direction of the vehicle 110 if the vehicle is moving forward. In another example, the first direction may be a tail direction of the vehicle 110 if the vehicle is moving backward. The first direction of the vehicle 110 is indicated as Xv. Xv is a vector that reflects the speed and direction of the vehicle 110. In one or more embodiments, the Xv component reflects not only speed and direction, but also angular velocity and angular acceleration of the vehicle 110.

A second direction that is perpendicular to the first direction may be referred to as a lateral direction Yv vector. A vehicle 110 may have a lateral component Yv when the vehicle 110 turns directions (e.g., turning right or left) instead of driving in a straight direction (e.g., driving forward or backward). For example, if the vehicle 110 meets a curved road, the vehicle 110 will both have a forward direction Xv component as well as a lateral direction Yv component.

Hereinafter, the term "vehicle frame" or "vehicle reference frame" is used to set a direction of the vehicle in relation to the various vectors of the vehicle 110. However, for the purpose of calculating the misalignment angle $\theta_m$, two vector components of the vehicle frame may be considered. For example, the forward direction of the vehicle frame may refer to the Xv vector of the vehicle, and the lateral direction of the vehicle frame may refer to the Yv vector of the vehicle, which is perpendicular to the Xv vector of the vehicle. The term "sensor frame," will be used in a similar sense to indicate the various vectors of the sensors in the device 120.

In one or more embodiments, the Xv component is measured using an inertial measurement unit (IMU), which can include the plurality of sensors of the device 120. The IMU includes sensors such as a 3-axis accelerometer and a 3-axis gyroscope. The 3 axes accelerometer sensor provides specific forces sensing in three orthogonal directions. The three axes gyroscope sensor provides angular rates sensing in three orthogonal directions. These are sometimes referred to as six Degrees of Freedom (DOF) IMU sensors. The calibrated six DOF IMU sensors have less sensor noise and error and, thus, produce reliable results having increased accuracy for a short duration. By using these sensors, various motion related data may be obtained by the device 120. For example, when the vehicle 110 accelerates or decelerates, the IMU of the device 120 will detect the acceleration and the angular acceleration of the vehicle 110 and calculate the direction of the force (F=ma; m: mass, a: acceleration) which will be indicative of the direction of the vehicle 110.

The IMU can measure and report a device's specific force, speed, movement direction, tilt direction of the device, angular velocity, angular acceleration, etc., using a combination of accelerometers and gyroscopes. The IMU allows analysis of the location of the device when the GPS/GNSS receiver does not work or has a limited signal strength, such as in tunnels, in parking garages, inside buildings, urban canyons, or when electronic interference is present.

In some embodiments, the Xv component may be measured using GPS/GNSS sensors of the device 120. The GPS/GNSS sensors can provide the speed and direction of Xv of the vehicle 110 until the GPS/GNSS signal is lost. The device 120 may utilize the GPS/GNSS information received to analyze and calculate the Xv component. After the signal is lost or the strength of the signal goes below a threshold incapable of locating the device 120, the device 120 may calculate Xv by using the sensors in the IMU. The GPS/GNSS data received until the GPS/GNSS signal is lost may be used in the calculation of the misalignment angle $\theta_m$.

In other embodiments, the Xv component may be measured using an odometer of the vehicle 110. In this embodiment, the vehicle 110 may be connected with the device 120 to communicate or share movement related information such as speed, direction, acceleration rate, angular velocity, angular acceleration, etc. Instead of using the GPS/GNSS sensors, accelerometers, or gyroscopes in the device 120, the device 120 may receive movement information directly from the vehicle 110. The connection between the device 120 and the vehicle 110 may be established through Bluetooth, Zigbee™, NFC™ (Near-field communication) or any suitable wireless connection. The connection can be also established by directly connecting the device 120 to the vehicle 110 by way of wire capable of sending and receiving data. In some embodiments, the battery charging cables for the device 120 that is connected with the vehicle 110 may be utilized to receive motion data from the vehicle 110. The Xv component may also be determined from a combination of these described methods.

The device can be coupled to a mobile device, such as a cellular phone, tablet, or other mobile device that hosts the application of the driver. The device can be paired, or otherwise coupled by a cord or wirelessly to share data between the device and the mobile device of the driver. This can be established through Bluetooth, Zigbee™, NFC' (Near-field communication) or any suitable wireless connection.

The information or data collected by the device 120 can be processed in the device, in the cloud, or on the mobile device of the driver, such us through the ride share application. The location based information gathered by the device and the sensors once processed can be utilized by the application to display an accurate location of the device with respect to a map of the driver, the rider, and the service.

As mentioned, in one or more embodiments, Xv and Yv are vectors of the vehicle 110 indicating the speed and direction of the vehicle 110. In other embodiments, the Xv and Yv vectors of the vehicle 110 may also be indicative of or reflecting any movement related factors suitable for calculating the misalignment angle $\theta_m$ such as the acceleration rate, angular velocity, or angular acceleration, etc., of vehicle 110 and the device 120. The Xv and Yv vectors correspond to the vehicle reference frame. The method for calculating the misalignment angle $\theta_m$ between the Xv vector of the vehicle 110 and the Xs vector of the sensor of the device 120 will be explained in detail throughout the specification.

The IMU which includes accelerometers and gyroscopes is fixed within the device 120 in a certain location or a certain direction so that it helps a user to indicate forward, backward, left and right directions or the north, south, east and west directions of the device 120, i.e., the sensor reference frame. Similar to the vehicle case, the heading of a device 120 may be determined in a similar manner. The heading of a device 120 or to be exact, the heading of the IMU (or hereinafter "a sensor frame" or "the sensor reference frame"), is the compass direction the sensor frame is pointing towards. In some embodiments, the heading direction of the vehicle frame and the heading of the device 120 are aligned to be in the same direction. If the heading of the vehicle and the heading of the sensor frame are not aligned in the same direction, sensor measurements are not usable for improving the accuracy of position.

In some embodiments, the sensor frame will be capable of finding its own tilt direction of the device 120 within a space using an X, Y, Z coordinate system (Cartesian coordinates) or an r, θ, φ spherical coordinate system (r: radial distance, θ: azimuthal angle, φ: polar angle) using measurement from the accelerometer and gyroscopes using sensor fusion.

The calculation of the pitch, yaw, and roll of the device 120 assists in bringing the sensor data from the sensor frame, Xs, Ys to local/vehicle/navigation frame. For the purpose of calculating misalignment angle $\theta_m$, the calculation of the Z axis measurement is optional. In some embodiments, the calculation related to the Z axis sensor component may be omitted to simplify the calculation process. When the device 120 is positioned in the vehicle 110, the position of the device 120 is not necessarily aligned with the horizon or the XY plane. While generally, forward direction Xv and lateral direction Yv of the vehicle 110 are aligned or parallel to the horizon, the device 120, in most cases, is going to be tilted with respect to the XY plane. This adds the complexity of calculating the misalignment angle $\theta_m$ between the vehicle 110 and the sensor frame of the device 120. In one embodiment, to calculate the misalignment angle $\theta_m$, the tilt direction which may also be calculated based on pitch, yaw, and roll of the device 120 is considered. In addition to the tilt of the sensor frame, the direction, angular velocity, angular acceleration, and any other suitable parameters of the device 120 are calculated using accelerometers and gyroscopes to extract the horizontal acceleration components. Xs is indicative of the horizontal component of the forward direction (or heading direction) of the sensor frame included in the device 120. Ys is indicative of the horizontal component of the lateral direction (or side direction) of the sensor frame included in the device 120 which is perpendicular to Xs. In one or more embodiments, Xs and Ys are vectors of the sensor frame of the device 120.

Figure 1B:
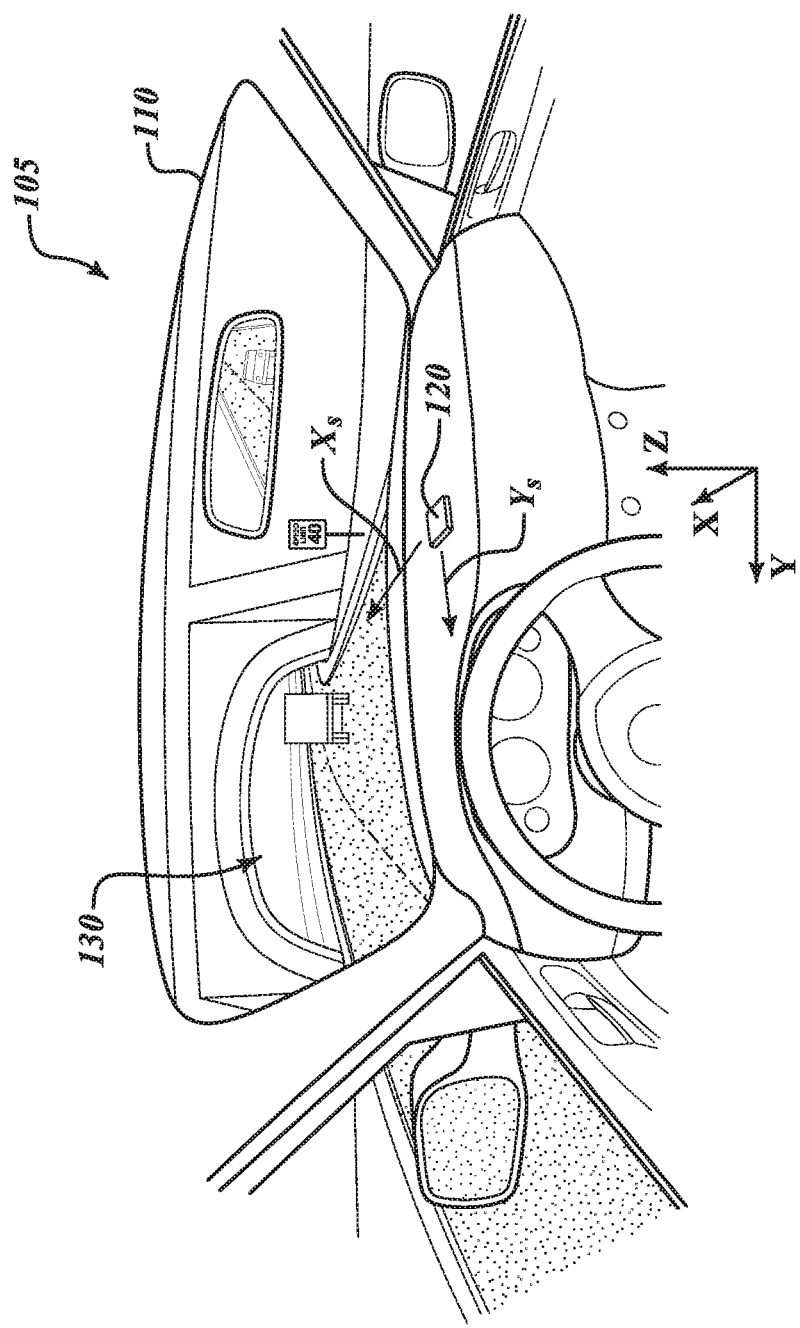
FIG. 1B is a view of the vehicle entering into a tunnel where there is low or no GPS/GNSS signals capable of being received with the device of FIG. 1A.

FIG. 1B is a view 105 of the vehicle 110 entering into a tunnel 130, which typically has low or no GPS/GNSS signals being received by the device 120 or the user's mobile phone such that the rider may have inaccurate information about the location of the driver. It is noted that this disclosure may be applied to emergency vehicles and their headquarters or other applications where accurate vehicle location in low or no GPS/GNSS environments is desired. Entering into a building or driving into tunnels causes the device 120 to lose reception of GPS/GNSS signals or receive weak signals below a threshold that is capable of location detection and the location of the user inside the vehicle 110 may soon be lost.

By calculating the misalignment angle $\theta_m$, the device's 120 inertial navigation system can accurately utilize the sensor data to compute accurately the location of the device 120 and the vehicle 110, even if the GPS/GNSS signals are either lost or weak, by using the sensors included in the device. In this embodiment, the device 120 is aligned with the horizon or the XY plane. If the device 120 is leveled, it puts the Xv of the vehicle and Xs of the sensor frame of the device 120 in the same XY plane, thus making the calculation of the misalignment angle $\theta_m$ between Xv and Xs easier. However, in most cases, as explained, the device 120 is likely to have a tilt.

In one embodiment, to determine the degree of tilt of the device 120, the positional relationship of the device 120 in terms of X, Y, Z components are determined using a gyroscope and an accelerometer of the device 120. After the degree of tilt of the device 120 is determined, only the horizontal components of X, Y are extracted for the purpose of calculating the misalignment angle $\theta_m$. However, as mentioned, in some embodiments the Z axis components can be considered in calculating the misalignment angle $\theta_m$. In other embodiments, GPS sensor can be optionally used to receive the Xs, Xv component as well as the other X, Y, Z components. Yet in other embodiments, the Xv component of the vehicle may be received directly from the odometer of the vehicle 110 or any other movement related sensors of the vehicle 110. By receiving speed, direction, angular velocity, angular acceleration information from the vehicle 110 through wireless or non-wireless means, this will reduce the calculation performed by the device 120. The algorithms for calculating the misalignment angle $\theta_m$ based on data received from the IMU will be detailed in later figures.

The device 120 as used herein that is suitable for including various sensors. An example of these sensors may include accelerometers or gyroscopes or odometers or any other sensors for detecting motion related data of the device 120 and the vehicle 110. Examples of motion related data may include, but are not limited to, direction, acceleration rate, angular velocity, angular acceleration, etc. The device 120 is can be a mobile device such a smart phone, tablet PC, GPS navigation device, or the like. In other embodiments, the device 120 can also be a separate standalone device manufactured for use in dead reckoning when GPS/GNSS signals are lost, such as the device shown in FIGS. 11A and 11B. Yet in other embodiments, the device 120 can be installed in a vehicle from the outset. In this case, the device 120 will be built into the vehicle and will be installed by the car maker in a known position. The device 120 may remain in the vehicle for the whole life of the vehicle. For these cases, factory calibration is applicable and this reduces many complex calculations related to the algorithm for computing the misalignment angle because the position of the device 120 within the vehicle 110 would be known.

The vehicle 110 as shown in FIGS. 1A and 1B indicates a car, but the application of the algorithm according to the present disclosure is not limited to vehicles and it may also be applicable to pickup truck or any other transportation vehicles. In other embodiments, the vehicle 110 may refer to drones, unmanned aerial vehicle (UAV), helicopters, boats, ships or air planes based on the application of the algorithm.

Figure 2:
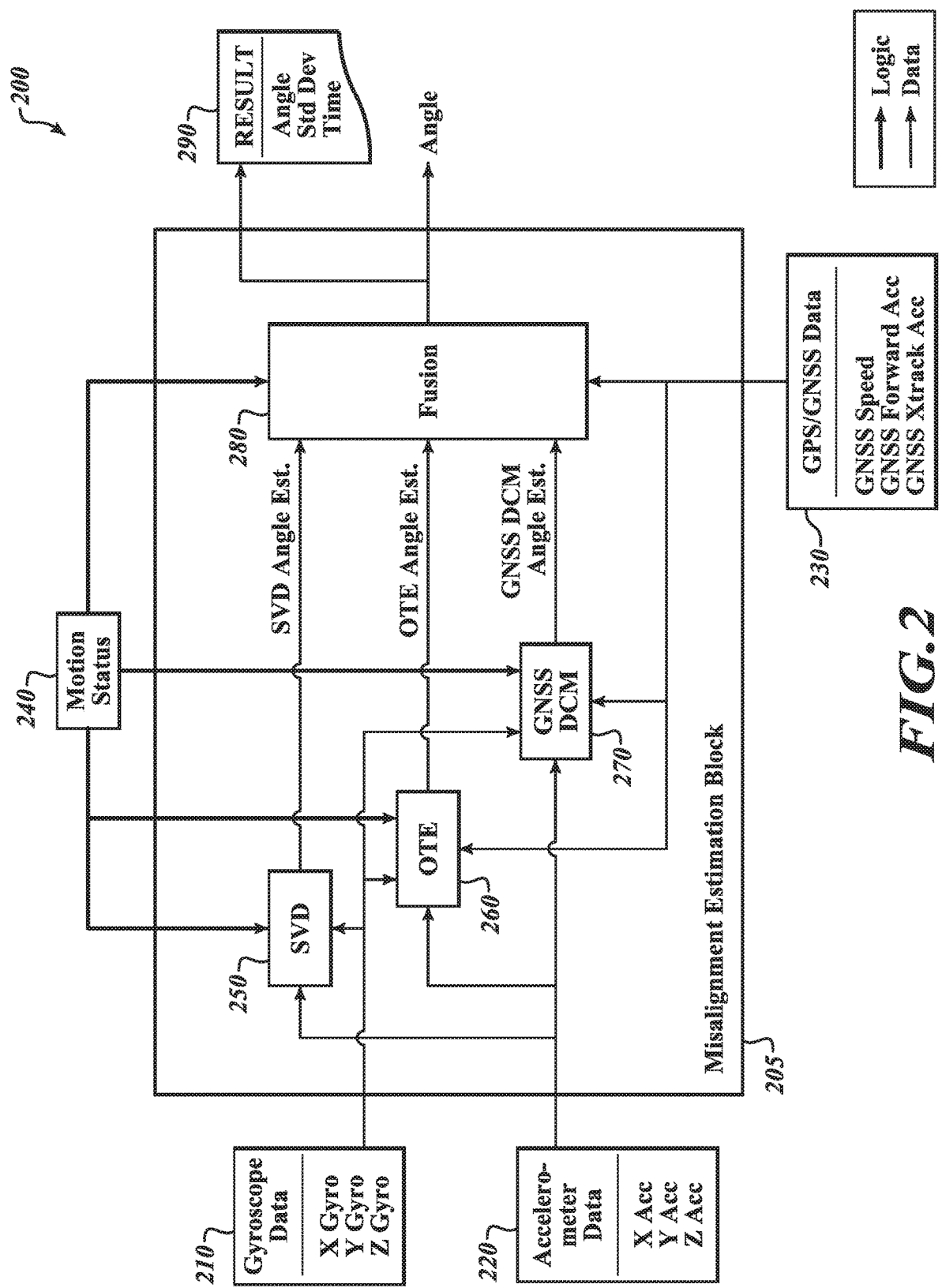
FIG. 2 is a system flow diagram for determining the misalignment angle $\theta_m$ using the device according to an exemplary embodiment of the present disclosure.

FIG. 2 is a system flow diagram 200 showing determining the misalignment angle $\theta_m$ using the device 120 according to an exemplary embodiment of the present disclosure. In one embodiment, a misalignment estimation block 205 determines the misalignment angle $\theta_m$ between the sensor frame and the vehicle frame using a Singular Value Decomposition (SVD) estimation method. Under this estimation method, the angle is determined by applying orthogonal transformation on the estimation of direction of motion using standalone inertial sensors in the device 120. In one or more embodiments, the vehicle dynamics under this estimation are modelled by non-holonomic constraints of the vehicle. These non-holonomic constraints relate to the fact that the vehicle dynamics are generally restricted to a forward direction. For example, the dynamics of vehicle motion may be restricted to a forward direction (longitudinal) because during navigation, the vehicle generally accelerates or decelerates along a straight line. When the vehicle moves along a straight line or road, the large component of the total acceleration will consist of longitudinal direction acceleration at acceleration and deceleration. The lateral direction component, which is perpendicular to the longitudinal direction, is likely to be minimal since most of the movement of the vehicle would be focused on moving forward. Considering these constraints may reduce or simplify the variables, formulas and algorithms involved in the misalignment angle calculation process.

In another embodiment, the misalignment estimation block 205 determines the misalignment angle between the sensor frame and the vehicle frame using an Orthogonal Transformation Estimation (OTE) method. Under this estimation method, the angle is determined by applying orthogonal transformation on the estimation of direction of motion using standalone inertial sensors in the device 120 as well as acceleration information derived from GPS/GNSS sensors. The vehicle dynamics under this estimation, too, are modelled by non-holonomic constraints of the vehicle.

Yet in another embodiment, the misalignment estimation block 205 determines the misalignment angle between the sensor frame and the vehicle frame using a GNSS Direction Cosine Matrix (GNSS DCM) method. Under this estimation method, the angle is determined by using inputs from the inertial sensors in the device 120 and the vehicle rotation matrix (DCM). The method further minimizes the error between the acceleration observed by the inertial sensor and the acceleration derived from GPS/GNSS sensors.

In further embodiments, the misalignment estimation block 205 determines the misalignment angle between the sensor frame and the vehicle frame using a fusion of the SVD, OTE, and GNSS DCM estimation methods. Under this estimation method, the output from the three estimation methods is weighted using a weighing technique to obtain an improved and accurate angle estimate with increased reliability. By utilizing the fusion method of all three estimation methods, a reliable angle result can be produced even under GPS/GNSS signal denied environments.

Referring to FIG. 2, the three axes gyroscope sensor provides angular rate sensing in three orthogonal directions at block 210. At block 220, the three axes accelerometer sensor provides specific forces sensing in the three orthogonal directions. At block 230, the GPS/GNSS sensor provides position, velocity and precise time (PVT) data. Acceleration and speed can be derived by the received velocity components from the GPS/GNSS sensor. In other embodiments, where GPS/GNSS signals are weak or lost, the GPS/GNSS data input may be optional depending on the environment. At block 240, the motion status information of the vehicle 110 is also inputted to the SVD block 250, OTE block 260, GNSS DCM block 270 and the fusion block 280. The motion status information of the vehicle can be categorized, for example, as 'stop,' 'forward straight,' 'turning,' 'reverse,' 'reverse straight,' etc. This motion status 240 can be obtained by processing accelerometer data using techniques know to a person in the related art.

In one embodiment, the gyroscope data 210, the accelerometer data 220, and the motion status 240 is inputted into the SVD block 250. The details of the processing in the SVD block 250 will be explained in FIG. 3. After the SVD angle estimation is produced based on the processing in the SVD block 250, the angle is inputted to the fusion block 280. In other embodiments, the SVD angle estimation produced based on the processing in the SVD block 250 may be output as the final result 290 without having to process through the fusion block 280.

In one embodiment, the gyroscope data 210, the accelerometer data 220, the GPS/GNSS data 230, and the motion status 240 is inputted into the OTE block 260. The details of the processing in the OTE block 260 will be explained in FIG. 4. After the OTE angle estimation is produced based on the processing in the OTE block 260, the angle is inputted to the fusion block 280. In other embodiments, the OTE angle estimation produced based on the processing in the OTE block 260 may be output as the final result 290 without having to process through the fusion block 280.

In one embodiment, the gyroscope data 210, the accelerometer data 220, the GPS/GNSS data 230, and the motion status 240 are inputted into the GNSS DCM block 270. The details of the processing in the GNSS DCM block 270 will be explained in FIG. 5. After the GNSS DCM angle estimation is produced based on the processing in the GNSS DCM block 270, the angle is inputted to the fusion block 280. In other embodiments, the GNSS DCM angle estimation produced based on the processing in the GNSS DCM block 270 may be output as the final result 290 without having to process through the fusion block 280.

In one or more embodiments, the fusion block 280 will receive the SVD angle estimation, the OTE angle estimation, the GNSS DCM angle estimation from the SVD block 250, the OTE block 260, the GNSS DCM block 270, respectively. Based on the combination of these angles after a weighing process based on the motion status of the vehicle and the signal strength of each sensors, the fusion block 280 outputs an optimal misalignment angle with increased reliability.

It will be readily understood by a person of ordinary skill in the art that the blocks, units, or modules within the misalignment estimation block 205 may be implemented as a software program or an algorithm that is capable of being executed through a processor in the device 120 or any other circuitry, programmed module, or programmable logic device (PLD) in the device 120. The processor may include any suitable processing unit capable of performing the embedded software or algorithm of each block or module, among other various functions of the device. For example, it may include, but is not limited to, mobile application processors, microprocessors implemented with electronic circuitry, PLD, programmable controller, programmable logic controller, a general purpose processor with necessary algorithms programmed to perform the function, an integrated circuit (IC) or the like.

Figure 3:
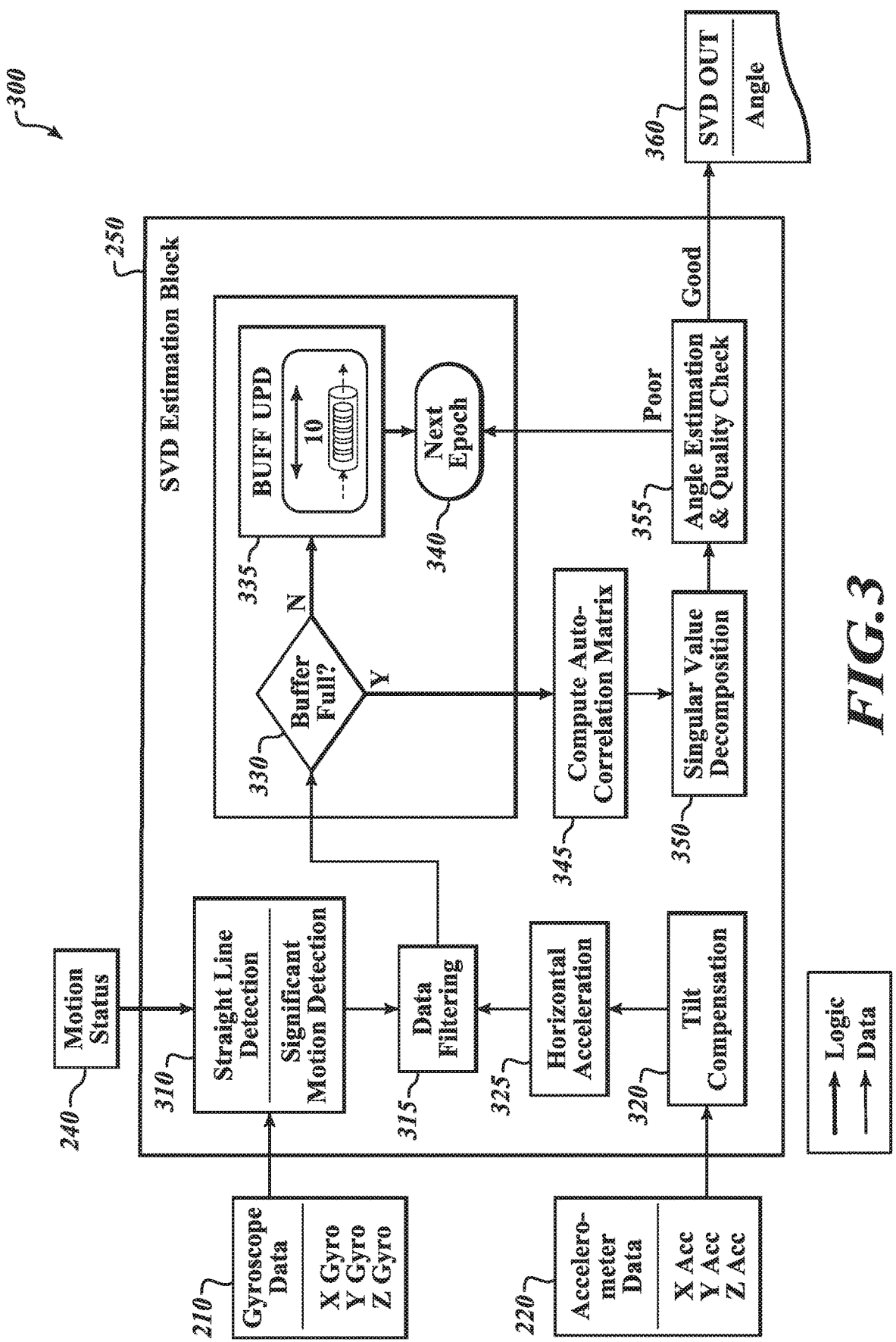
FIG. 3 is a flow diagram of determining a misalignment angle $\theta_m$ under the singular value decomposition (SVD) estimation method according to an exemplary embodiment of the present disclosure.

FIG. 3 is a flow diagram 300 showing determining a misalignment angle $\theta_m$ under the singular value decomposition (SVD) estimation method according to an exemplary embodiment of the present disclosure. The SVD estimation block 250 included in the processor of the device 120 receives the motion status of the vehicle 240, the gyroscope data 210 and the accelerometer data 220. The processor of the device 120 may also use the GPS/GNSS data to determine the motion state of the vehicle but may be optional.

When a vehicle is moving straight, and in case of a perfect alignment where the misalignment angle $\theta_m$ is 0 degrees, the signal measured by the accelerometer should be only concentrated in an axis pointing forward, the forward axis, with a lateral axis sensing pure noise. On the other hand, in case of imperfect alignment where the misalignment angle $\theta_m$ is not 0 degrees, the amount of the forward acceleration will be sensed by the lateral axis. Accordingly, a vehicle's forward acceleration provides sufficient information to estimate the angle offset between vehicle frame and sensor frame. A detailed explanation for calculating the misalignment angle $\theta_m$ will be explained further below.

At the SVD estimation block 250, the accelerometer data 220 is received. The accelerometer data 220 includes the accelerometer data in the X direction (X Acc), the accelerometer data in the Y direction (Y Acc), and the accelerometer data in the Z direction (Z Acc). In one or more embodiments, the accelerometer in the device 120 is capable of receiving the X Acc, Y Acc, and Z Acc data of the vehicle 110. For example, if the vehicle 110 is moving in a straight, forward direction, the acceleration components of the X direction (assuming that the vehicle is driving towards a hypothetical X direction) will be significant compared to the Y Acc, Z Acc components. If the vehicle 110 is making a turn (e.g., left, right or U-turn), the acceleration components of the +Y or −Y direction (assuming that the vehicle is turning towards the Y direction) will be significant compared to the X Acc, Z Acc components. If the vehicle 110 is going uphill or downhill, the acceleration components of the +Z or −Z direction (assuming that the vehicle is moving towards the Z direction) will be significant compared to the X Acc, Y Acc components.

At the SVD estimation block 250, the gyroscope data 210 is also received. The gyroscope data 210 includes the data from the gyroscope in the X direction (X Gyro), the data from the gyroscope in the Y direction (Y Gyro), and the data from the gyroscope in the Z direction (Z Gyro). In one or more embodiments, the gyroscope in the device 120 is capable of receiving the X Gyro, Y Gyro, and Z Gyro data of the device 120. In some embodiments, the sensor frame of the device 120 may be detected using the gyroscope signals X Gyro, Y Gyro, Z Gyro to calculate the tilt of the device 120 with reference to the vehicle 110. Based on the gyroscope signals, the accelerometer signals X Acc, Y Acc, Z Acc can be tilt compensated at block 320. These tilt compensated signals are then finally filtered in order to select the straight horizontal parts of the accelerometer signals X Acc, Y Acc at block 325. In other embodiments, the GPS/GNSS sensors can be used separately or in conjunction with the accelerometer or other sensors if the GPS/GNSS signals are available.

Referring back to FIG. 3, at the straight line detection/significant motion detection block 310, the processor of the device 120 determines the motion status 240 of the vehicle, based on the gyroscope data 210 and the accelerometer data 220. In some embodiments, the processor of the device 120 may use the gyroscope data 210 to determine whether the vehicle 110 is moving in a straight line or moving significantly in a non-straight line. As with the other embodiments, the use of the GPS/GNSS data may be optional.

At the detection block 310, whether the vehicle is moving in a straight line or in a significant motion (turn) is determined by the processor. In order to determine the movement of the vehicle, the processor receives sensor input from the gyroscope of the device 120. If the vehicle 110 accelerates or decelerates while navigating along a straight line, the gyroscope will not measure significant angular velocity. Further, the value of the gyroscope may be indicative of the amount of rotation applied to the device 120 in the vehicle 110. Based on the sensed data from the gyroscope and considering the angular velocity, the processor may determine that the vehicle 110 is in a straight line movement and the vehicle 110 is turning. If the vehicle 110 is travelling along a path that is not straight, for example, taking a left or right turn, or a U-turn, the gyroscope will be able to sense change in angle or angular velocity by the turn. In this case, the processor may determine that the vehicle 110 is in a significant motion (turn) rather than a straight line movement. If the gyroscope senses a significant angular velocity value below a threshold value, the processor of the device may conclude that there is no turn movement in any direction. The angular acceleration sensed by the gyroscope has to be higher than the threshold value (e.g., a threshold that indicates if the value is below this threshold value there may be no movement or insignificant movement, and if the value is above this threshold value there may be movement), for the processor to determine that the vehicle is not stationary (or also moving at a constant velocity) and accelerating/decelerating.

In other embodiments, the accelerometer data 220 may be used. The processor may use the gyroscope data 210 in combination with the accelerometer data 220. If the device 120 senses an acceleration value below a threshold value indicating that there is acceleration movement in any direction, the processor may determine that the vehicle 110 is stationary or moving at a constant velocity. In reality, unless the vehicle 110 is at a complete stop, a noise value of the acceleration in any direction may be present. Accordingly, an acceleration value above the threshold value will be indicative of acceleration or deceleration. In some embodiments, the processor may determine, based on the accelerometer data 220 and the gyroscope data 210, to determine the vehicle's straight line movement or significant movement.

In the tilt compensation block 320, the accelerometer is used to determine the tilt direction of the device 120. In one embodiment, the roll and pitch angle of the device 120 is calculated to determine the tilt direction. The roll and pitch angle of the device 120 or, more exactly, the sensor frame of the device 120, is detected using the accelerometer data. Based on the accelerometer data 220, the accelerometer signals X Acc, Y Acc, Z Acc are tilt compensated for the purpose of extracting the horizontal components of the accelerometer signals. In other embodiments, the gyroscope signals X Gyro, Y Gyro, Z Gyro is used in conjunction with the accelerometer signals X Acc, Y Acc, Z Acc for calculating the tilt direction and tilt compensation at block 320.

In the horizontal acceleration block 325, these tilt compensated signals are received and they are filtered in order to select the straight horizontal parts of the signals. Based on the accelerometer signals X Acc, Y Acc, Z Acc, the horizontal acceleration component HX Acc, HY Acc, HZ Acc are extracted after considering the tilt of the device 120 (or more accurately the tilt of the sensor frame). In some embodiments, the gyroscope signals X Gyro, Y Gyro, Z Gyro may be used for tilt compensation. These gyro signals are inputted to calculate the tilt and the calculated tilt direction is used to extract the straight horizontal parts of the accelerometer signals X Acc, Y Acc, Z Acc at block 325.

In the data filtering block 315, the motion status information processed from the motion detection block 310 and the input from the gyroscope data 210 are combined with the accelerometer data 220 and the information processed through the horizontal acceleration block 325. At the data filtering block 315, any noise or data irrelevant to the analysis of the misalignment angle is filtered out. In some embodiments, the filter may have a certain filter range for passing signals that fall within that range and filtering out the rest of the signals. For example, any random noise signals not indicative of accurately reflecting the vehicle motion may not be considered. This filtered out data will not be passed along to the buffer 330 for storing as it may be likely to contain noise. In other embodiments, the data filtering block 315 may remove acceleration when there is no sufficient movement. That is, if the acceleration value is close to zero (which means there is not any significant movement), it will remove the acceleration value. The data filtering block 315 extracts only the accelerometer data when significant acceleration is detected to ensure that irrelevant data or noise data is not input to the buffer block 330.

After data filtering is performed at the data filtering block 315, the block 315 outputs the filtered data to the buffer 330. In the buffer 330, if the data is enough for analyzing the misalignment angle, the data in the buffer 330 will be passed to the auto-correlation matrix block 345 for computation. The processor may determine whether the data in the buffer 330 exceeds the minimum threshold amount for calculating the misalignment angle to produce a reliable result. For example, the data in the buffer 330 may be accumulated to the point that it will produce a misalignment angle between the IMU axes and vehicle longitudinal direction with an accuracy better than 2 degrees. In other embodiments, the buffer may be updated when the accuracy is to be better than 1 degree.

On the other hand, if the amount of data accumulated in the buffer 330 is not enough, the process proceeds to block 335 to update the buffer. The buffer will be updated by receiving renewed sensor data for the next epoch 340 or based on a selected interval of time. The buffer after being updated based on the data received in the next epoch may provide the information regarding vehicle motion (e.g., acceleration, tilt direction, etc.) from the IMU to the buffer 330. The processor may determine whether the buffer 330 has enough data for calculating the misalignment angle to produce a reliable result. If the processor determines that the buffer 330 has not met the threshold indicating sufficient minimum data for misalignment calculation, the processor will not proceed with the misalignment angle estimation based on the accumulated data and will update the buffer again at block 335.

At the autocorrelation matrix block 345, the processor computes the input data received using an autocorrelation matrix. In one embodiment, the two accelerations in the horizontal plane, X Acc, Y Acc, are input to the autocorrelation matrix block 345. During or after computing using the autocorrelation matrix, a SVD method is used at the SVD block 350 to minimize the correlation between the two X, Y components of accelerometer signal (e.g., acceleration vector). Here, the input to the SVD block 350 is a cross correlation matrix (2×2) between X axis acceleration and the Y axis acceleration. That is, the autocorrelation matrix block 345 and the SVD block 350 proceed based on the below process.

$$\begin{bmatrix} XAcc \\ YAcc \end{bmatrix}_{2 \times N} \rightarrow$$

$$\text{Auto Correlation Block} \rightarrow \begin{bmatrix} \Sigma XAcc * Xacc & \Sigma XAcc * Yacc \\ \Sigma YAcc * Xacc & \Sigma YAcc * Yacc \end{bmatrix}_{2 \times 2} \rightarrow SVD$$

After angle estimation is produced based on the SVD method, the misalignment angle is checked as to the reliability of the results. At angle estimation and quality check block 355, the reliability of the angle is tested to minimize the error and increase the level of quality of the misalignment angle. In one embodiment, at quality check block 355, the processor computes the quality of the output and filters any poor estimates. By filtering out the poor estimates, it improves the quality and the reliance of the final output. When the processor determines that the quality is poor at quality check block 355, it can receive input from the next epoch 340 and update the buffer 335 again to receive sufficient data for computation. As previously mentioned, the determination on whether the quality is good or poor may depend on the produced misalignment angle between IMU axes and vehicle longitudinal direction having an accuracy better than 2 degrees. This means that the calculation solely based on IMU will not deviate more than 2 degrees from the actual vehicle route in a GPS/GNSS signal absent environment.

In one or more embodiments, the process in quality check block 355 includes checking the variance ratio of the rotated X axis (the forward axis) and the Y axis (the lateral axis) using SVD. For example, since the acceleration in the forward axis is high, the variance should be high compared to the lateral axis. If the ratio of variance in the forward axis and the lateral axis is high, this indicates that the quality of the SVD is good. In other embodiments, the process in quality check block 355 includes checking the minimum variance in the forward axis. Yet in other embodiments, the process in quality check block 355 includes checking the minimum number of samples N (e.g., N in 2×N data).

In some embodiments, a quality check is performed to ensure the accuracy and the quality of the produced misalignment angle. This check is performed at quality check block 355. In other embodiments, the quality check may be performed during any suitable stage in order to maintain the integrity and the accuracy of the data. The data check process is not limited to being performed at only certain stages of the algorithm. Once quality is confirmed, the SVD angle is output at block 360. The misalignment angle based on the SVD method, along with the X and Y component of the horizontal acceleration, may be stored in cumulative form to minimize the storage. For example, the data may be stored in the form of a mean, variance, cross-correlation, or the like.

Figure 4:
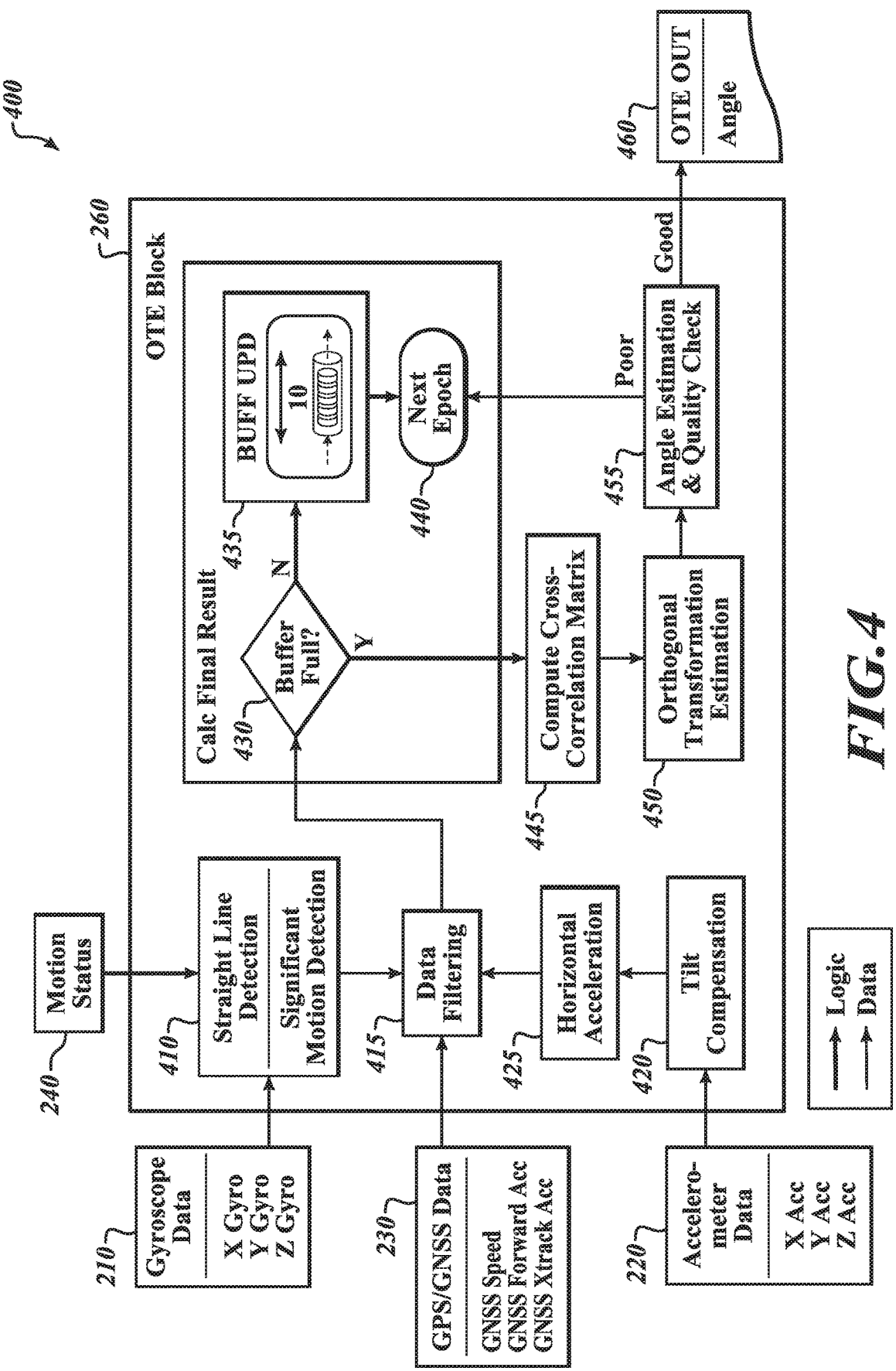
FIG. 4 is a flow diagram of determining a misalignment angle $\theta_m$ under the orthogonal transformation estimation (OTE) method according to an exemplary embodiment of the present disclosure.

FIG. 4 is a flow diagram 400 of determining a misalignment angle $\theta_m$ under the orthogonal transformation estimation (OTE) method according to an exemplary embodiment of the present disclosure. In one embodiment, the OTE block 260 included in the processor of the device 120 receives the motion status of the vehicle 240, the gyroscope data 210 and the accelerometer data 220. As with other embodiments, the processor of the device 120 may use the GPS/GNSS data 230 as an option. For the sake of simplicity, blocks that perform similar functions compared to the SVD estimation block 250 will be omitted. Blocks or modules named the same or similar as FIG. 3 will generally function in the same or similar manner. The same or similar functionality will not be explained here in order not to be repetitive.

At the straight line detection/significant motion detection block 410, the processor of the device 120 determines the motion status 240 of the vehicle, based on the gyroscope data 210. In one embodiment, the gyroscope data 210 along with the motion status of the vehicle 240 is used to detect straight road sections.

In the tilt compensation block 420, the accelerometer is used to determine the tilt direction of the device 120. Once the tilt compensation is calculated in block 420, the results of the accelerometer signals, X Acc, Y Acc, and Z Acc are output to the horizontal acceleration block 425.

In the horizontal acceleration block 425, the horizontal acceleration component HX Acc, HY Acc, HZ Acc are extracted based on the tilt compensated signals. In some embodiments, the gyroscope signals X Gyro, Y Gyro, Z Gyro may be used for tilt compensation. These gyro signals are inputted to calculate the tilt and the calculated tilt direction is used to extract the straight horizontal parts of the accelerometer signals.

In the data filtering block 415, the motion status information processed from the motion detection block 410 and the input from the gyroscope data 210 are combined with the accelerometer data 220 and the information processed through the horizontal acceleration block 425. At the data filtering block 415, the GPS/GNSS data 230 is also considered. In one or more embodiments, the GPS/GNSS data 230 may be used in conjunction with the motion detection block 410, or block 420, or block 425 to improve the calculation when the GPS/GNSS signals are present.

After data filtering is performed at the data filtering block 415, the data filtering block 415 outputs the filtered data to the buffer 430. In the buffer 430, if the data is enough for analyzing the misalignment angle, the data in the buffer 430 will be passed to the cross-correlation matrix block 445 for computation. The processor may determine whether the data in the buffer 430 exceeds the minimum threshold amount for calculating the misalignment angle to produce a reliable result. For example, the data in the buffer 430 may be accumulated to the point that will produce a misalignment angle between IMU axes and vehicle longitudinal direction with accuracy better than 2 degrees. That is, a misalignment angle between sensor frame (Xs) and the vehicle frame (Xv) with accuracy better than 2 degrees. In other embodiments, the buffer may be updated when the accuracy is to be better than 1 degree.

On the other hand, if the amount of data accumulated in the buffer 430 is not enough, the step proceeds to block 435 to update the buffer. The buffer will be updated by receiving renewed sensor data for the next epoch 440. The processor may determine whether the buffer 430 has enough data for calculating the misalignment angle to produce a reliable result. If the processor determines that the buffer 430 has not met the threshold indicating sufficient minimum data for misalignment calculation, the processor will not proceed with the misalignment angle estimation based on the accumulated data and will update the buffer again at block 435.

At the cross-correlation matrix block 445, the processor computes the data received using a cross-correlation matrix. The cross-correlation between a cross-correlation transformation matrix and the input from the GPS/GNSS data 230 is computed. In block 450, the orthogonal transformation estimation is applied between the horizontal X Acc, Y Acc and the GPS/GNSS data 230. At the orthogonal transformation estimation block 450, the orthogonal transformation minimizing the correlation between horizontal X, Y acceleration components (e.g., Xs and Ys of the sensor frame of the device 120, Xv and Yv of the vehicle frame of the vehicle 110) and GPS/GNSS is found. When the orthogonal transformation minimizing the correlation between the horizontal X, Y acceleration components and GPS/GNSS is found, an orthogonal transformation matrix is applied to produce the misalignment angle.

In other embodiments, the two X, Y components of accelerometer signal after being processed using the OTE method, may refer to the horizontal value of the vehicle frame (Xv and Yv) and the sensor frame (Xs and Ys).

In one or more embodiments, by using the orthogonal transformation matrix, the relationship between the acceleration component of the vehicle frame and the acceleration component of the sensor frame may be established as follows:

$$Acc_{VEHICLE} = R * Acc_{SENSOR} \text{ (R denotes the orthogonal transformation matrix)}$$

The degree of rotation of the orthogonal transformation represents the misalignment angle $\theta_m$.

The horizontal components of the vehicle Xv and Yv may be represented using the below matrix $$Acc_{VEHICLE} = \begin{bmatrix} XAcc\_Vehicle \\ YAcc\_Vehicle \end{bmatrix}.$$

In addition, the horizontal components of the sensor frame Xs and Ys may be represented using the below matrix $$Acc_{SENSOR} = \begin{bmatrix} XAcc_{Sensor} \\ YAcc_{Sensor} \end{bmatrix}.$$

By applying the orthogonal transformation matrix according to the aforementioned $Acc_{VEHICLE} = R * Acc_{SENSOR}$ formula, $$R = \begin{bmatrix} \cos(\text{Angle}) & \sin(\text{Angle}) \\ -\sin(\text{Angle}) & \cos(\text{Angle}) \end{bmatrix}, \text{ where Angle} = \text{misalignment angle } \theta_m.$$

The following equation can be established:

$$\begin{bmatrix} XAcc\_Vehicle \\ YAcc\_Vehicle \end{bmatrix} = \begin{bmatrix} \cos(\text{Angle}) & \sin(\text{Angle}) \\ -\sin(\text{Angle}) & \cos(\text{Angle}) \end{bmatrix} * \begin{bmatrix} XAcc_{Sensor} \\ YAcc_{Sensor} \end{bmatrix}.$$

The calculation of the above equation produces the misalignment angle $\theta_m$ between the vehicle frame and the sensor frame.

After the angle estimation is produced based on the OTE method, the misalignment angle is checked as to the reliability of the results. At the angle estimation and quality check block 455, the reliability of the angle is tested to reduce the error and increase the level of quality of the misalignment angle. In one embodiment, at block 455, the processor computes the quality in the output and filters poor estimates. By filtering out the poor estimates, it improves the quality and the reliance of the final output. When the processor determines that the quality is poor at block 455, it can receive input from the next epoch 440 and update the buffer 435 again to receive sufficient data for computation.

As previously mentioned, the determination on whether the quality is good or poor may depend on aforementioned accuracy angle levels (e.g., 2 degrees).

Once quality is confirmed, the OTE angle is output at block 460. The misalignment angle based on the OTE method, along with the X and Y component of the horizontal acceleration, may be stored in cumulative form to minimize the storage as with other embodiments.

Figure 5:
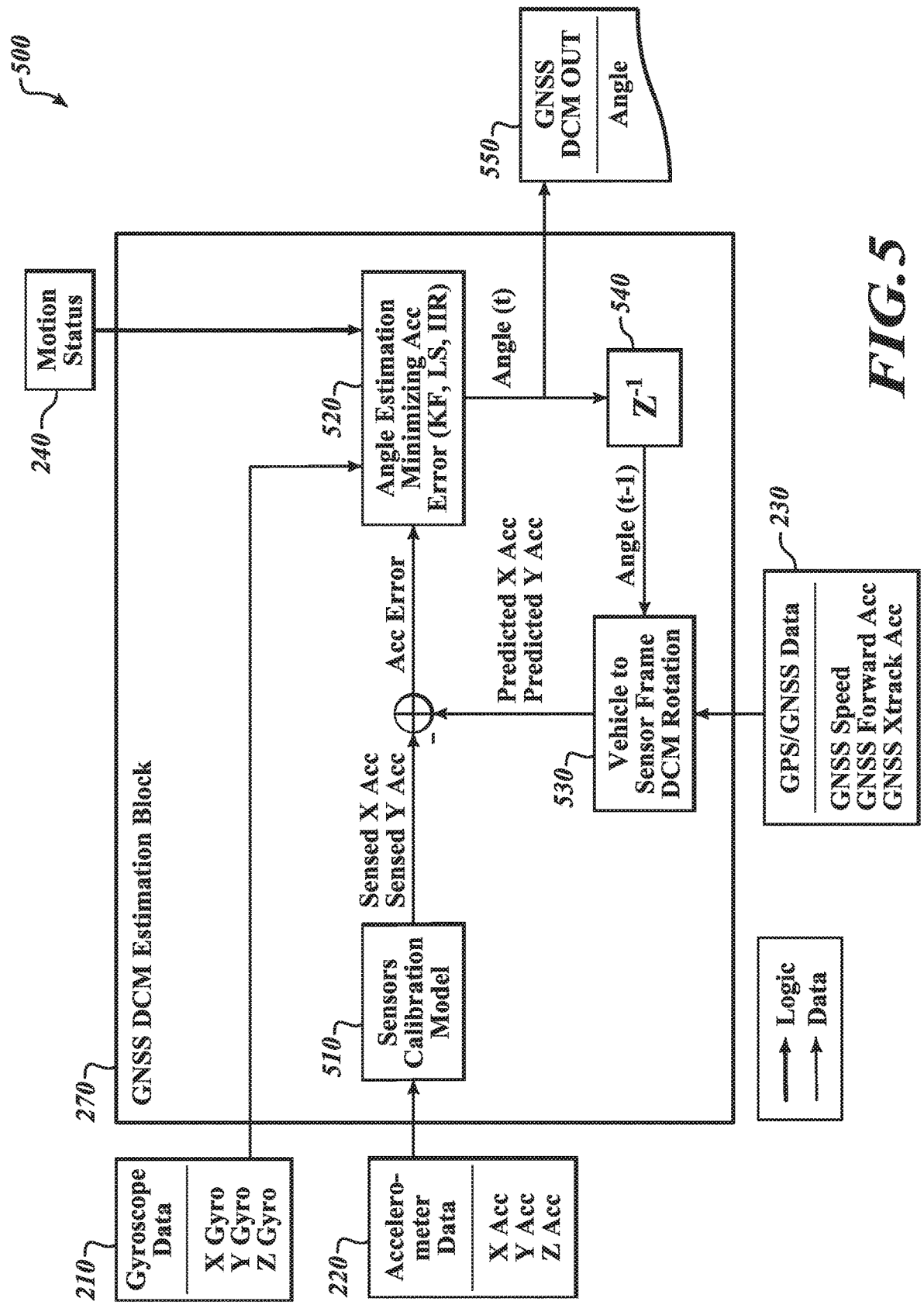
FIG. 5 is a flow diagram of determining a misalignment angle $\theta_m$ under the GNSS direction cosine matrix (DCM) method according to an exemplary embodiment of the present disclosure.

FIG. 5 is a flow diagram 500 of determining a misalignment angle $\theta_m$ under the GNSS direction cosine matrix (DCM) method according to an exemplary embodiment of the present disclosure. In one embodiment, the GNSS DCM estimation block 270 included in the processor of the device 120 receives the motion status of the vehicle 240, the gyroscope data 210, the accelerometer data 220, and the GPS/GNSS data 230.

At the sensor calibration model block 510, the accelerometer data 220 is received. Here, accelerometer measurement is tilt (e.g., pitch and roll) compensated to yield an IMU horizontal acceleration. In one embodiment, the sensor calibration model block 510 may calculate the horizontal acceleration component HX Acc, HY Acc by using the accelerometer data 220. In other embodiments, the sensor calibration model block 510 may calculate the horizontal acceleration components by tilt compensation using gyroscope signals X Gyro, Y Gyro, Z Gyro from the gyroscope data 210. The sensor calibration model block 510 may extract horizontal acceleration components based on the tilt compensated signals. These gyro signals may be inputted to sensor calibration model block 510 to calculate the tilt and the calculated tilt direction is used to extract the straight horizontal parts of the accelerometer signals X Acc, Y Acc.

Based on the above calculation method, the sensor calibration model block 510 outputs the calibrated acceleration data for the X acceleration component and the Y acceleration component. This calibrated acceleration data in the X axis and the Y axis is actually sensed data compared to the predicted acceleration data in the X axis and the Y axis output from the vehicle to sensor frame DCM rotation block 530 that is produced based on the calculation from the angle estimation minimizing acceleration error block 520.

At the angle estimation minimizing acceleration error block 520, the processor of the device 120 receives the motion status 240 of the vehicle and the gyroscope data 210. Based on these inputs, the angle estimation minimizing acceleration error block 520 outputs an angle in the time domain at time t, namely angle (t). In one embodiment, the angle estimation minimizing acceleration error block 520 is implemented using a Kalman Filter. In block 520, the Kalman filter predicts the angle in order to minimize or substantially reduce the error between the acceleration measured by the IMU sensors in the sensor frame and the GNSS acceleration rotated to the sensor frame. The Kalman Filter estimates an angle at which both the acceleration measured from the IMU sensors and the GPS/GNSS sensors are similar. The angle that produces the acceleration measured from the IMU sensors and the GPS/GNSS sensors that are similar indicates that this angle has the least or minimum error. After the process at block 520, the angle in the time domain, angle (t), is then inputted into the inverse Z transform block 540. The inverse Z transform, Z-1, outputs an angle (t-1), an angle at time $t^{-1}$.

In the vehicle to sensor frame DCM rotation block 530, the GPS/GNSS data 230 is received. The GPS/GNSS data 230 includes the speed of the vehicle determined using the GPS/GNSS sensor, GNSS speed. The GPS/GNSS data 230 also includes the forward acceleration and other acceleration information. In one embodiment, at the vehicle to sensor frame DCM rotation block 530 the processor applies a rotation matrix to the inputs. For example, the block 530 rotates the forward and lateral acceleration measured by the GPS/GNSS sensors to X and Y acceleration in the sensor frame produced by angle estimation. In one embodiment, the rotation is represented as follow:

$$\begin{bmatrix} XAcc\_Sensor \\ YAcc\_Sensor \end{bmatrix} = \begin{bmatrix} \cos(Angle) & -\sin(Angle) \\ \sin(Angle) & \cos(Angle) \end{bmatrix} * \begin{bmatrix} XAcc\_Vehicle \\ YAcc\_Vehicle \end{bmatrix}.$$

After the calculation at the vehicle to sensor frame DCM rotation block 530, the processor outputs a predicted X acceleration component and the Y acceleration component based on angle (t-1) outputted from the $Z^{-1}$ transform and the GPS/GNSS data 230. In one embodiment, the predicted or considered accelerations may match the same reference frame of the sensor frame of the IMU when ported from the vehicle frame. Accelerations from the GPS/GNSS navigation sensors are ported to the sensor frame of the device 120 using a rotation matrix using the misalignment angle and tilt direction of the device 120. Any difference between the sensor frame and the vehicle frame is proportional to the misalignment angle. As explained, in the vehicle to sensor frame DCM rotation block 530, accelerations detected based on the GPS/GNSS sensor is rotated by the misalignment angle to port them into the sensor frame data outputted from the sensors calibration model block 510, and the results of the actually sensed X, Y acceleration component and the predicted X, Y acceleration component are compared.

In the angle estimation minimizing acceleration error block 520, the processor receives the acceleration error based on the difference between the actually sensed X, Y acceleration component and the predicted X, Y acceleration component. The processor estimates the optimum angle, reducing the root mean square error between the GPS/GNSS acceleration (prediction) and the IMU acceleration (actual measurement) at the angle estimation minimizing acceleration error block 520.

The GNSS DCM estimation block 270 calculates based on comparing the horizontal acceleration measured independently by two sources, the IMU sensor in the device 120 and the GPS/GNSS sensor which may be located in the vehicle 110. In some embodiments, the GPS/GNSS sensor may be located within the device 120. After an error between the predicted acceleration value and the sensed acceleration value is minimized using various filters including the Kalman Filter (KF), Infinite Impulse Response (IIR) filter, and LS filters, the misalignment angle with a reduced error is output at block 550. The filter that may be used for reducing or minimizing the angle estimation error is not limited to the KF, IIR, LS filters, and a person of ordinary skill in the art would readily understand that other suitable filters can be applied to obtain substantially the same or similar results. As explained, the implementation of block 520 was performed by using a Kalman Filter, but other filters may be applied to achieve the same or similar results.

Figure 6:
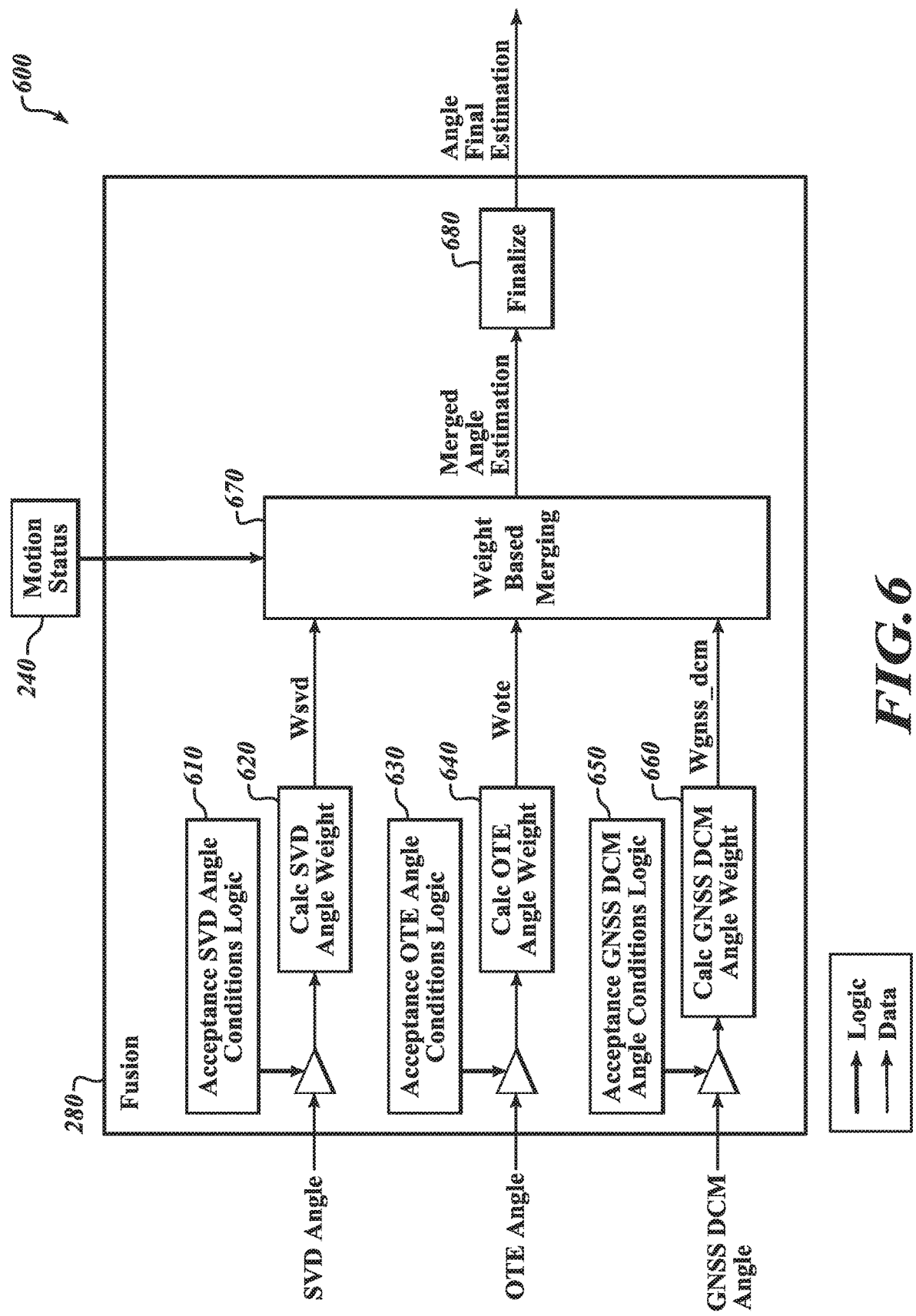
FIG. 6 is a flow diagram of a fusion block of the outputted misalignment angles according to an exemplary embodiment of the present disclosure.

FIG. 6 is a flow diagram 600 of a fusion block 280 of the outputted misalignment angles according to an exemplary embodiment of the present disclosure. The processor of the device 120 receives the SVD angle calculated from the SVD estimation block 250, the OTE angle calculated from the OTE block 260, the GNSS DCM angle calculated from the GNSS DCM estimation block 270. The output from the three estimation methods is merged to get a unique and improved angle estimate with increased reliability. In one or more embodiments, the fusion is operated by a Kalman Filter and can work in all possible scenarios, including a GPS/GNSS signal denied environment.

At block 610, the acceptable SVD angle conditions are considered before applying the angle weight at block 620. The acceptance SVD angle conditions block 610 determines whether the received SVD angle is within an acceptable range that will produce a reliable misalignment angle. Acceptance conditions specific for each input are applied at block 610. At calculation of the SVD angle weight block 620, the processor determines how much weight will be applied based on multiple factors. For example, the factors may include, but are not limited to, the presence or absence of certain sensors, the signal strength received based on the sensors, the motion characteristics of the vehicle, the path conditions the vehicle is being driven on, etc. In other embodiments, the calculation SVD angle weight block 620 outputs confidence and weight which reflect how accurate or erroneous the output is. In blocks which may be implemented using Kalman Filters, the measurement of the SVD angle made by applying the Kalman Filter is associated with uncertainty that is proportional to the weights. For example, if the uncertainty is great, the value of the produced angle (the SVD angle) may be given less weight. On the other hand, if the uncertainty is less, the value of the produced SVD angle may be given greater weight than the OTE angle or the GNSS DCM angle. Once it determines the weight, the SVD angle is given a weight factor, $W_{SVD}$.

At block 630, the acceptable OTE angle conditions are considered before applying the angle weight at block 640. The acceptance OTE angle conditions block 630 determines whether the received OTE angle is within an acceptable range that will produce a reliable misalignment angle. Acceptance conditions specific for each input are applied at block 630. At calculation of the OTE angle weight block 640, the processor determines how much weight will be applied based on multiple factors. In other embodiments, the calculation OTE angle weight block 640 outputs confidence and weight which reflect how accurate or erroneous the output is. The blocks which may be implemented using Kalman Filters, the measurement of the OTE angle by applying the Kalman Filter is associated with uncertainty that is proportional to the weights. For example, if the uncertainty is great, the value of the produced angle (the OTE angle) may be given less weight. On the other hand, if the uncertainty is less, the value of the produced OTE angle may be given greater weight. Once it determines the weight, the OTE angle is given a weight factor, $W_{OTE}$. As explained in connection with block 620, the Kalman Filter can be implemented based on the above mentioned formula and relationship between variables.

At block 650, the acceptable GNSS DCM angle conditions are considered before applying the angle weight at block 660. The acceptance GNSS DCM angle conditions block 650 determines whether the received GNSS DCM angle is within an acceptable range that will produce a reliable misalignment angle. Acceptance conditions specific for each input are applied at block 650. At calculation of the GNSS DCM angle weight block 660, the processor determines how much weight will be applied based on multiple factors. In other embodiments, the calculation of the GNSS DCM angle weight block 660 outputs confidence and weight which reflect how accurate or erroneous the output is. As explained, the blocks may be implemented using Kalman Filters, and the measurement of the GNSS DCM angle by applying the Kalman Filter is associated with uncertainty that is proportional to the weights. For example, if the uncertainty is great, the value of the produced angle (the GNSS DCM angle) may be given less weight. On the other hand, if the uncertainty is less, the value of the produced GNSS DCM angle may be given greater weight. Once it determines the weight, the GNSS DCM angle is given a weight factor, $W_{GNSS\_DCM}$. As explained in connection with blocks 620 and 640, the Kalman Filter can be implemented based on the above mentioned formula and the relationship between variables.

At the weight based merging block 670, the processor receives the motion status 240 and the SVD angle, OTE angle, GNSS DCM angle, and respective weight $W_{SVD}$, $W_{OTE}$, $W_{GNSS\_DCM}$. The fusion method applied at the weight based merging block 670 combines the output of the misalignment angle. The combination can rely on different techniques such as the use of KF filters, adaptive IIR filters. However, the fusion method is not limited to these filters. In one embodiment, the KF approaches can be used to estimate the final misalignment angle by minimizing the root mean square error between the measurement data and the predicted data. In other embodiments, the fusion method provides a final permanent estimate of the misalignment angle based on a set of selected metrics minimization. However, a person of ordinary skill in the art would appreciate that other methods may be used to achieve similar results.

After the misalignment angles are weighted, the merged angle estimation is inputted to the finalize estimation block 680. In one embodiment, at the finalize estimation block 680, the algorithm keeps monitoring confidence to accept or reject the new merged misalignment angle estimation. Since the misalignment angle may remain constant for a short duration, the processor may reject any poor misalignment angle estimates. In some embodiments, the processor may refine the current estimation of the misalignment angle by taking renewed angles and renewed weight based on the confidence. In other embodiments, at the finalize estimation block 680, the confidence and stability are monitored over time to produce a reliable angle final estimation.

Figure 7:
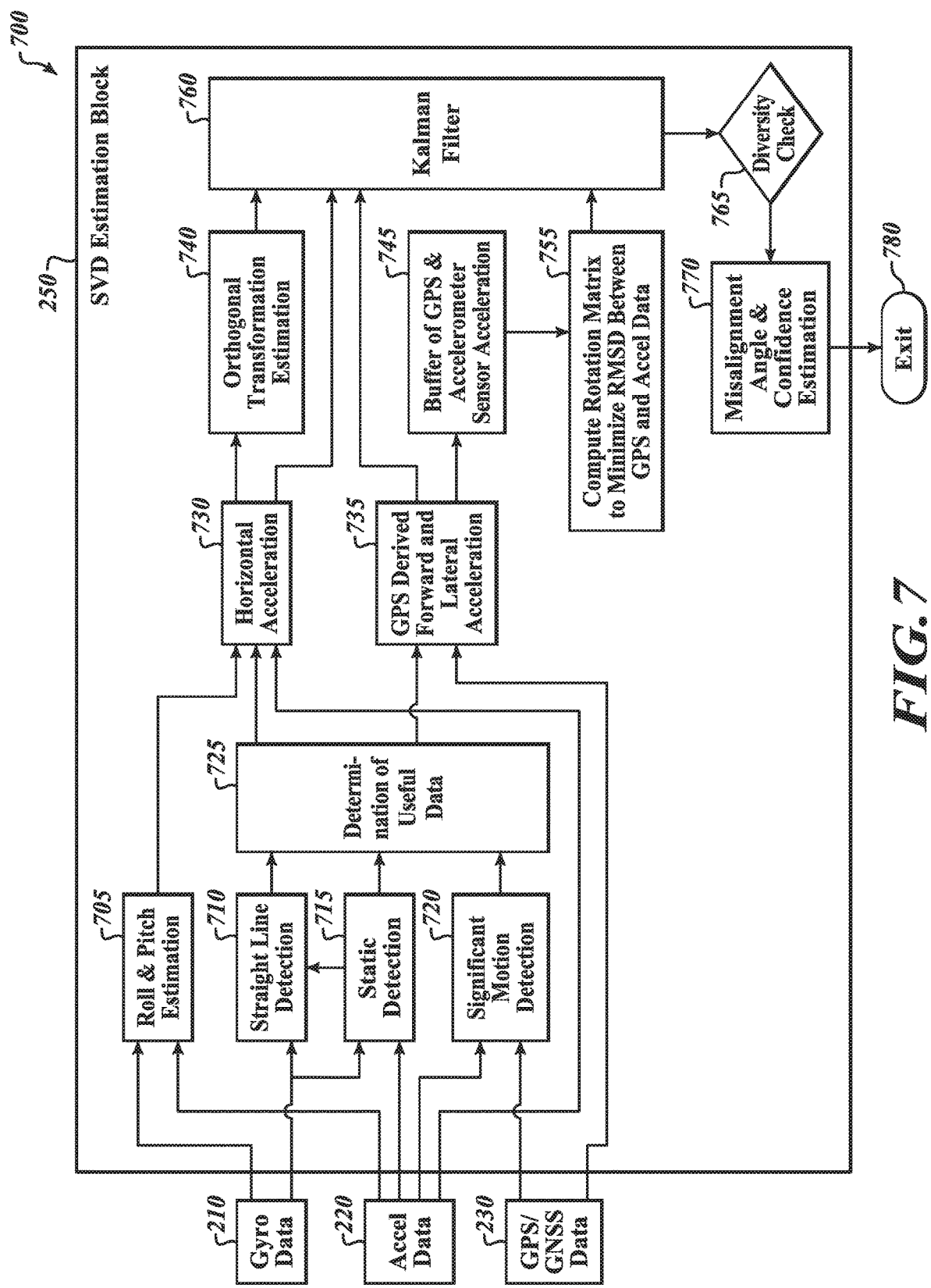
FIG. 7 is a flow diagram of determining a misalignment angle $\theta_m$ under the SVD estimation method according to another embodiment of the present disclosure.

FIG. 7 is a flow diagram 700 of determining a misalignment angle $\theta_m$ under the SVD estimation method according to another embodiment of the present disclosure. In one embodiment, the SVD estimation block 250 included in the processor of the device 120 receives the gyroscope data 210 and the accelerometer data 220. In some embodiments, the processor of the device 120 may also use the GPS/GNSS data 230 to determine the motion state of the vehicle 110. Three motion states of the vehicle, straight line detection 710, static detection 715, and significant motion detection 720, will be explained.

The processor of the device 120 may detect at static detection block 715 whether the vehicle is stationary or moving. At static detection block 715, in order to determine whether a vehicle is stationary or moving, the processor receives sensor input from the accelerometer and the gyroscope of the device 120. Static detection is important to initialize gravity vector and gyro bias computation. If the accelerometer in the device 120 senses an acceleration value below a threshold value indicative of an acceleration movement in any direction, the processor may determine that the vehicle 110 is stationary or moving at a constant velocity. In reality, unless the vehicle is at a complete stop, a noise value of the acceleration in any direction may be present. In some embodiments, the processor may determine whether the vehicle 110 is stationary or moving based on the comparison of the value of the accelerometer data 220 received and the threshold value. If the accelerometer senses angular acceleration above a threshold value, the processor may determine that the vehicle 110 is not moving in a straight line. Further, to confirm the motion state of the vehicle 110, the processor may use the gyroscope data 210 in combination with the accelerometer data 220. In some embodiments, the processor may consider both the gyroscope data 210 and the accelerometer data 220 at the same time, or analyze the data one at a time in any order.

The straight line detection is performed primarily to extract segments of measurement data where the vehicle is moving in a straight line and no significant lateral acceleration is observed. The straight line detection is driven by tests on negligible (above threshold) yaw rate condition over fixed window length. At the straight line detection block 710, the processor may confirm that the vehicle 110 is moving in a straight line by further utilizing the gyroscope data 210 along with the accelerometer data 220. For example, the gyroscope data 210 may show information about the motion status of the vehicle 110 when the vehicle accelerates or decelerates. When the vehicle 110 accelerates, the gyroscope of the device 120 can pick up the acceleration information because the device 120 will likely tilt together even though it may fixated in a certain location in the vehicle 110 due to the acceleration. Gyro bias may also be considered in connection with analyzing the motion status of the vehicle 110. In some embodiments, after the initial determination of the motion status of the vehicle at the static detection block 715, the processor may proceed to the straight line detection block 710 for further determination of the vehicle movement.

At the significant motion detection block 720, the processor determines that the motion dynamics are significant based on the accelerometer data 220 and the GPS/GNSS data 230. Significant motion detection block 720 is used to extract sensor data during motion when acceleration (above a threshold) is present in the longitudinal direction. When the vehicle is moving at constant speed motion, there is not sufficient information available to help with determination of the misalignment angle. During acceleration or deceleration, sensor data for this motion contains sufficient information about motion direction. In one embodiment, the significant motion is detected using the GPS speed, if GPS available. In one embodiment, the module checks the change in speed from the last 2 seconds or total horizontal acceleration in 1 second. Here, if the vehicle 110 is stationary, the gravity vector may be updated with high weight and the gyro bias may be computed. If the vehicle 110 is not moving in a straight line or no significant motion detected, the processor may wait for the next measurement epoch.

Referring back to the significant motion detection block 720, the processor uses the accelerometer data 220 to determine if motion dynamics are significant to use it for calculation of the misalignment angle and confidence estimation. In other embodiments, the processor may use the GPS/GNSS data 230, if available, to determine the motion dynamics and use it for calculating the misalignment angle and confidence estimation. In one embodiment, a significant motion dynamic may refer to an event of a vehicle 110 moving in a non-static manner while changing the direction of the vehicle 110. For example, if the vehicle 110 is constantly making turns left to right, these motions may be referred to as being significant and will be sensed through the accelerometer. In other examples, a vehicle's motion may be significant when the angular velocity of the vehicle 110 changes frequently in a certain period of time. The value of the angular acceleration of the vehicle 110 may also be used in determining significant vehicle motion.

In the roll and pitch estimation block 705, the accelerometer is used to determine the roll and pitch angle of the device 120. The roll and pitch angle of the device 120 or, more exactly, the sensor frame of the device 120, is detected using the gyroscope signals X Gyro, Y Gyro. Based on the gyroscope signals, the accelerometer signals X Acc, Y Acc are tilt compensated. In some embodiments, the Z axis component can be considered in tilt compensation. These tilt compensated signals are then finally filtered in order to select the straight horizontal parts.

At the determination of useful data block 725, the processor aggregates the motion status information from the straight line detection block 710, static detection block 715, and the significant motion detection block 720. The processor will determine the dominant motion status of the vehicle 110 at this stage and determine which analyzed data would be used for calculation. In one embodiment, the processor at the determination of useful data block 725 will calculate the noise amount of the data detected and if it falls shorter than the minimum threshold value, it may discard the data based on the determination that a significant amount of noise is included in the data. In another embodiment, the processor at the determination of useful data block 725 will give a weight based on the signal/noise ratio of each piece of data, and filter out irrelevant data that will not be used for calculating the misalignment angle. Further, at block 725, predominant movement may be extracted for calculating the misalignment angle, and any bumps due to the road condition will also be filtered out as noise (e.g., even though a vehicle is moving in a straight line, bumps or ramps may cause the Z axis of the accelerometer to sense value; however, these noise values may be filtered out based on the dominant motion of the vehicle during a certain period of time or epoch). When the data is processed at block 725, the data is inputted into the horizontal acceleration block 730 and the GPS derived forward and lateral acceleration block 735.

In one embodiment, at the horizontal acceleration block 730, the processor receives input from the roll and pitch estimation block 705, the determination of useful data block 725 and the GPS/GNSS data 230. In another embodiment, at the horizontal acceleration block 730, the processor receives all of the input from the gyroscope data 210, the accelerometer data 220, the GPS/GNSS data 230, as well as the input processed through the straight line detection block 710, the static detection block 715, the significant motion detection block 720, the roll and pitch estimation block 705, and the determination of useful data block 725. In some embodiments, the processor may have only some of the sensed data at the horizontal acceleration block 730. In some examples, if there is only a straight line movement in the vehicle, the data processed through the significant motion detection block 720 may be omitted or not used. In this block 730, the processor extracts the horizontal acceleration component based on the data received. In some embodiments, the horizontal acceleration block 730 keeps this data in the buffer of the device 120. If the amount of data reaches a threshold indicating sufficient minimum data for misalignment calculation, the processor will proceed with the misalignment angle estimation based on the accumulated data.

At the GPS derived forward and lateral acceleration block 735, the processor calculates the forward and lateral acceleration of the vehicle 110 based on the input from the GPS/GNSS data 230 and the determination of useful data block 725.

At the orthogonal transformation estimation block 740, the processor may compute the inputs based on the data received from the horizontal acceleration block 730. In one embodiment, an autocorrelation transformation matrix may be used. After computing using the autocorrelation transformation matrix, a SVD method is used to minimize the correlation between the two X, Y components of accelerometer signal (e.g., acceleration vector). An exemplary process is explained in a block below:

$$\begin{bmatrix} XAcc \\ YAcc \end{bmatrix}_{2xN} \rightarrow$$

$$\text{Auto Correlation Block} \rightarrow \begin{bmatrix} \Sigma XAcc*Xacc & \Sigma XAcc*Yacc \\ \Sigma YAcc*Xacc & \Sigma YAcc*Yacc \end{bmatrix}_{2X2} \rightarrow SVD.$$

In one embodiment, the two X, Y components of accelerometer signal after being processed using the SVD method, may refer to the horizontal value of the vehicle frame (Xv and Yv) and the sensor frame (Xs and Ys).

In one or more embodiments, by using the above computation method, the relationship between the acceleration component of the vehicle and the acceleration component of the sensor frame may be established as follows:

$Acc_{VEHICLE} = R*Acc_{SENSOR}$ (R denotes the rotation matrix).

The rotation of the orthogonal transformation represents the misalignment angle $\theta_m$.

The horizontal components of the vehicle Xv and Yv extracted from the horizontal acceleration block 730 may be represented using the below matrix:

$$Acc_{VEHICLE} = \begin{bmatrix} XAcc\_Vehicle \\ YAcc\_Vehicle \end{bmatrix}.$$

In addition, the horizontal components of the sensor frame XS and YS extracted from the horizontal acceleration block 730 may be represented using the below matrix:

$$Acc_{SENSOR} = \begin{bmatrix} XAcc_{Sensor} \\ YAcc_{Sensor} \end{bmatrix}.$$

By applying the rotation matrix according to the aforementioned $Acc_{VEHICLE} = R*Acc_{SENSOR}$ formula, $$R = \begin{bmatrix} \cos(\text{Angle}) & \sin(\text{Angle}) \\ -\sin(\text{Angle}) & \cos(\text{Angle}) \end{bmatrix}, \text{ where Angle} = \text{misalignment angle } \theta_m.$$

The following equation can be established:

$$\begin{bmatrix} XAcc\_Vehicle \\ YAcc\_Vehicle \end{bmatrix} = \begin{bmatrix} \cos(\text{Angle}) & \sin(\text{Angle}) \\ -\sin(\text{Angle}) & \cos(\text{Angle}) \end{bmatrix} * \begin{bmatrix} XAcc_{Sensor} \\ YAcc_{Sensor} \end{bmatrix}.$$

The calculation of the above equation produces the misalignment angle $\theta_m$ between the vehicle and the sensor frame.

In some embodiments, by applying the orthogonal transformation to identify the axis orientation, it is possible to minimize the correlation between two acceleration vectors which are in the sensor frame. In other embodiments, the orthogonal transformation is applied such that the correlation of $ACC_{VEHICLE}$ can be minimized. After the orthogonal transformation estimation block 740 produces the misalignment angle, the misalignment angle is outputted to the Kalman Filter block 760.

At the buffer block 745, the GPS and accelerometer information is stored in a memory of the device 120. At the computation block 755, the rotation matrix that minimizes the root mean square deviation (RMSD) between the GPS data and accelerometer data is determined. This output is provided to the Kalman Filter (KF) block 760. In one embodiment, valid measurements are inputted and fused in the KF block 760 to estimate optimum results. In one embodiment, the determination of useful data block 725 filters out any measurements that have significant noise components provided to the subsequent blocks valid measurements. For example, valid measurements may refer to measurements that are noise filtered and integrity of the data is above a threshold that ensures output misalignment angle having less than 2 degrees of error.

At the KF block 760, inputs from the various blocks are analyzed and a misalignment angle output is produced. The details of the KF block 760 will be explained in detail later on.

At the diversity check block 765, the processor may determine whether the produced misalignment angle output is consistent enough to move forward with the calculation of the misalignment angle. If the processor does not determine that the data is sufficient, the process will receive further data accumulation in the next epoch. In one or more embodiments, diversity is also checked using the Eigenvalue ratio.

At the misalignment angle and confidence estimation block 770, the processor computes the confidence in the output which allows to filter poor estimates. By filtering out the poor estimates, it improves the quality and the reliance of the final output. In some embodiments, to minimize the error any suitable error minimization algorithm may be applied and without limitation to certain algorithms. In other embodiments, updated data may be received from the gyroscope data 210 or the accelerometer data 220, and follow through the previously mentioned blocks to reduce the error in the misalignment angle. After a reliable misalignment angle is produced, the aforementioned algorithm proceeds to block 780 and exits the process.

Figure 8:
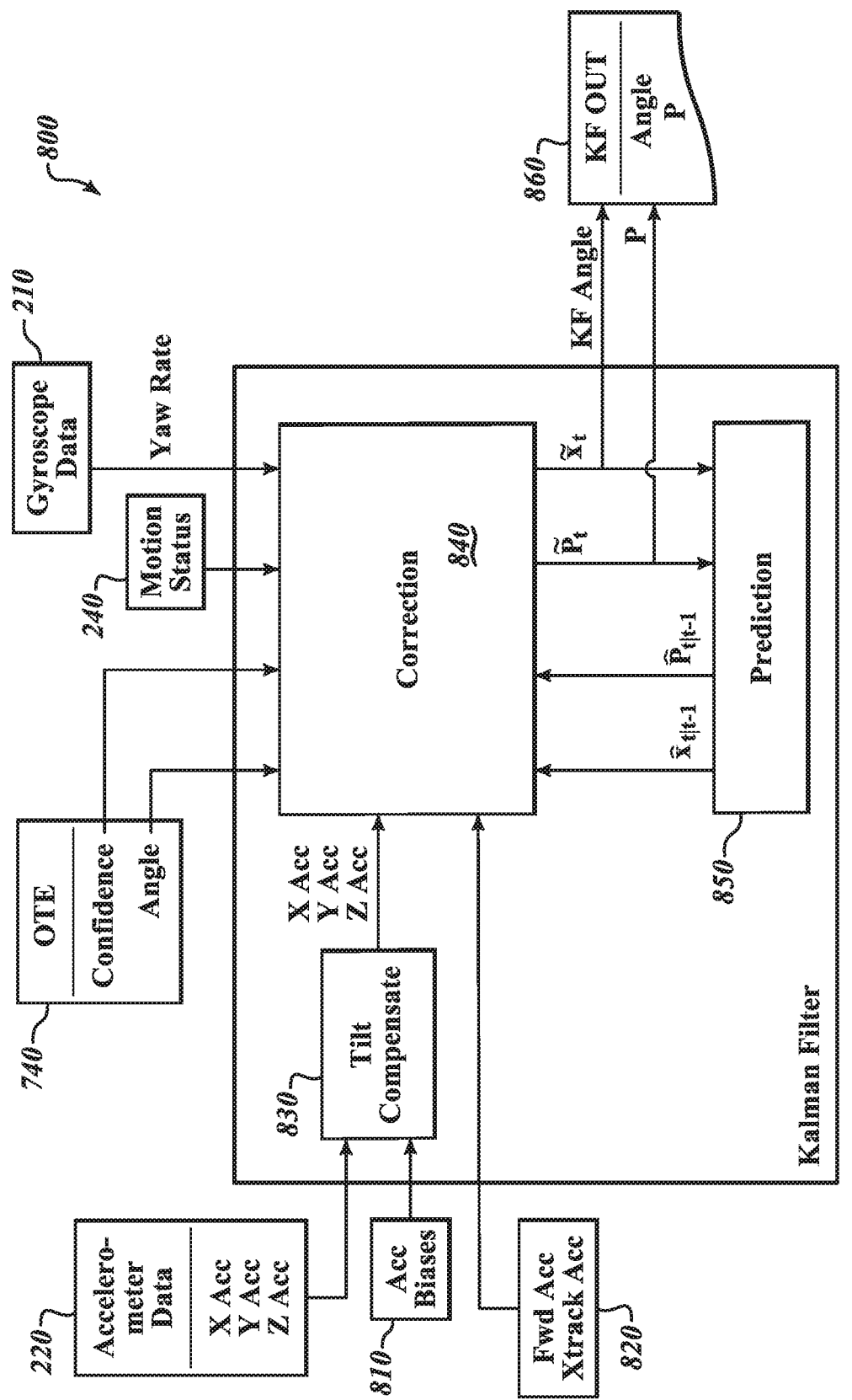
FIG. 8 is a flow diagram of an exemplary Kalman Filter according to one embodiment of the present disclosure.

FIG. 8 is a flow diagram 800 of an exemplary Kalman Filter according to one embodiment of the present disclosure. Kalman filtering is an algorithm that uses a series of measurements observed over time, containing statistical noise and other inaccuracies. The filter produces estimates of unknown variables that tend to be more accurate than those based on a single measurement alone, by estimating a joint probability distribution over the variables for each timeframe. In one embodiment, the algorithm works in a two-step process. In the prediction step, the Kalman filter produces estimates of the current state variables, along with their uncertainties (e.g., noise, inaccuracies, etc.). Once the outcome of the next measurement (necessarily corrupted with some amount of error, including random noise) is observed, these estimates are updated using a weighted average, with more weight being given to estimates with higher certainty. The algorithm may be recursive. In one example, it can run in real time, using only the present input measurements and the previously calculated state and its uncertainty matrix, and no additional past information is required. FIG. 8 shows one way of using the Kalman Filter according to the present disclosure. In one or more embodiments, a similarly designed Kalman Filter may be used in multiple blocks or modules for misalignment calculation. In addition, the Kalman Filter as depicted in FIG. 8 may be used to implement for the Kalman Filter block 760 in FIG. 7.

In one embodiment, at the tilt compensate block 830 of the Kalman Filter, the processor receives an accelerometer data 220. In some embodiments, the acceleration biases 810 may also be considered in calculating the tilt direction at the tilt compensate block 830. Based on the tilt compensation, the processor outputs an acceleration vector that has a horizontal X, Y acceleration component. In some embodiments, a vertical Z acceleration component may also be calculated.

In one embodiment, at the correction block 840, the processor receives misalignment angle and confidence information from the OTE block 740, the motion status 240, and gyroscope data 210, along with the tilt compensated acceleration component from block 830 and forward acceleration, cross-track acceleration from block 820. In other embodiments, the misalignment angle or the confidence value does not necessarily have to be received from an OTE block and could be based on other calculation of the angle such as using and SVD method or a GNSS DCM method or other suitable misalignment angle calculation method. While the acceleration bias block 810 and forward/cross-track acceleration block 820 are divided into separate blocks, these acceleration information can be retrieved from the accelerometer and, thus, from the accelerometer data 220. In one embodiment, the correction block 840 receives the yaw rate from the gyroscope data 210. Based on the above input, the processor computes the misalignment angle x at time t, $x_t$ and the error covariance P at time t, $P_t$. The misalignment angle x at time t, $x_t$ and the error covariance P at time t, $P_t$ are output to the prediction block 850. The prediction block 850 produces a misalignment angle $x_{t|t-1}$ at time t-1, and the error covariance $P_{t|t-1}$ at time t-1. After receiving the misalignment angle $x_{t|t-1}$ at time t-1 and the error covariance $P_{t|t-1}$ time t-1, the processor computes a final misalignment angle and a final error covariance value and outputs at block 860. The specific process within each block will be explained in detail in relation with FIG. 9.

Figure 9:
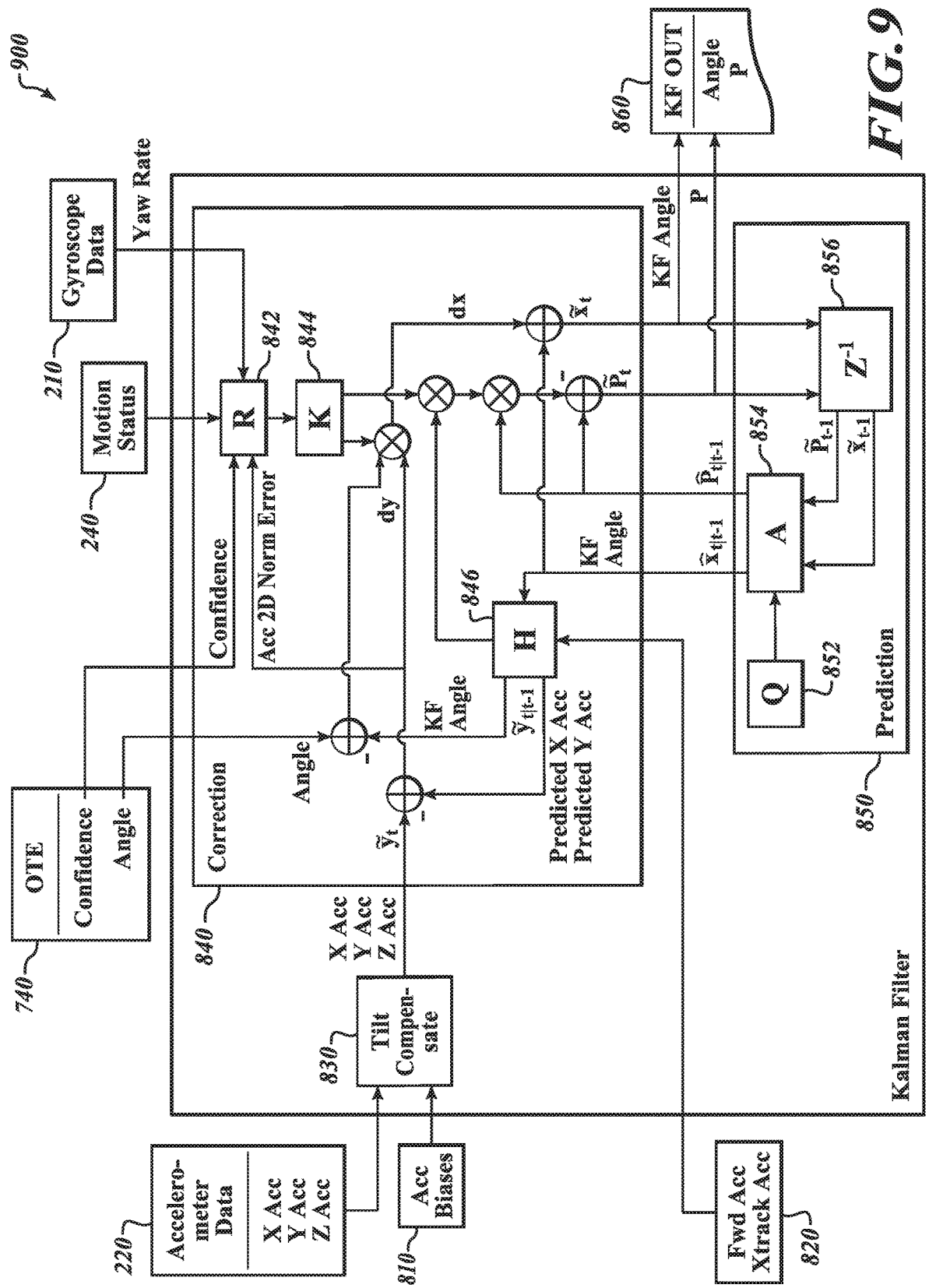
FIG. 9 is a detailed flow diagram of an exemplary Kalman Filter shown in FIG. 8 according to one embodiment of the present disclosure.

FIG. 9 is a detailed flow diagram 900 of an exemplary Kalman Filter shown in FIG. 8 according to one embodiment of the present disclosure. A person of ordinary skill in the art will readily understand that the process set forth in the correction block 840 and the prediction block 850 using various filters is just one way of implementing the correction block 840 and the prediction block 850. Other suitable filters and process may be added or altered or replaced based on the teachings of the present disclosure. In one embodiment, the correction block 840, R, K, and H filters are included for the calculation of the X, Y acceleration components. Further, in the prediction block 850, Q, A, Z filters are included for the calculation of the predictive X, Y acceleration components. In one embodiment, the uncertainty is represented by symbol "R" in the Kalman Filter.

Once the initial estimates for $x_{k-1}$ and $P_{k-1}$ is inputted to the prediction block, the Q, A, Z filters in the prediction block 850 processes the input. In one embodiment, the input projects the state ahead based on the following relationship:

$$\hat{x}_{\bar{k}} = A\hat{x}_{k-1} + Bu_k.$$

The prediction block 850 also projects the error covariance $P_{\bar{k}}$ ahead based on the following relationship:

$$P_{\bar{k}} = AP_{k-1}A^T + Q.$$

Once the prediction is made in the prediction block 850, the input is provided to the correction block 840 including the R, K, and H filters.

In one embodiment, the Kalman gain $K_k$ may be calculated based on the following formula.

$$K_k = P_{\bar{k}}H^T(HP_{\bar{k}}H^T + R)^{-1}.$$

The update estimate of $x_k$ with measurement $z_k$ can be expressed by the following formula:

$$\hat{x}_k = \hat{x}_{\bar{k}} + K_k(z_k - H\hat{x}_{\bar{k}}).$$

The error covariance $P_k$ may be expressed based on the following relationship:

$$P_k = (I - K_k H)P_{\bar{k}}$$

After the angle based on the Kalman Filter and the error covariance is produced, the update of the prediction block and the update of the measurement from the correction block can occur recursively to produce a misalignment angle that produces the least amount of error and error covariance to the output block 860.

Accordingly, the correction block 840 may update its calculation process by receiving the confidence from the OTE block 740, motion status 240, the yaw rate from the gyroscope data 210, acceleration 2-dimensional norm error at the R filter block 842. After the processing in the R filter block 842, the output is inputted into the K filter block 844. The K filter block 844 produces output so that the X, Y acceleration components can be inputted to the Z filter block 856. At the Z filter block 856, the covariance error P and the misalignment angle x are inputted. These series of processes may be performed based on the previously explained formula and variable relationship.

The measured input is then provided to the inverse Z transform block 856 of the prediction block 850, and $Z^{-1}$ outputs an angle (t-1), an angle at time t-1 (angle $x_{t-1}$) and an error covariance $P_{t-1}$ at time t-1. The output is received at the A filter block 854 along with the output from the Q filter block 852. The misalignment angle $x_{t|t-1}$ at time t-1, and the error covariance $P_{t|t-1}$ at time t-1 are fed back to the correction block 840. In particular, the misalignment angle $x_{t|t-1}$ is fed into the H filter block 846, and based on the H filter block 846, predicted X, Y acceleration components are produced. Similarly, this series of processes may be performed based on the previously explained formula and variable relationship as well.

These inputs are fed back into the correction block 840 and go through the previously explained process in a recursive manner to reduce and produce a final optimized misalignment angle and error covariance value at block 860.

FIG. 10 is a flow diagram of a finalize estimation block 680 according to another embodiment of the present disclosure.

In one embodiment, the finalize estimation block 680 is responsible for when to override the existing misalignment angle. As explained in connection with FIG. 6, after the weight based merging block 670 produces a merged misalignment angle estimation, the angle is further examined to determine whether to produce this angle as a final estimate. In other embodiments, the finalize estimation block 680 may update the existing misalignment angle.

At the block 680, a misalignment angle estimated by the Kalman Filters in the previous stage is provided along with the error covariance value P from the filters. The angle and the P value are inputted to the calculation validity metrics block 1010. The calculation validity metrics block 1010 checks at block 1020 whether the error covariance value P is lower than the previous last P value. In some embodiments, at block 1020, the error covariance value P is saved when it has the smallest value. Regarding the angle, the angle is fed into the First-in First-out (FIFO) block 1015 and the angle samples are outputted to the standard deviation calculation block 1025. At block 1025, the standard deviation is calculated for the angle samples and produces an angle to block 1050.

When the validity process starts at block 1035, the processor initially checks whether there is enough data or samples accumulated for a validity check at block 1040. If there is not enough data, the processor acquires more data from the sensors at the next epoch 1055. If there is enough data, the processor proceeds to block 1045 to check if the current error covariance is lower than last P value. Here, block 1045 receives a P value based on the inputs from the calculation validity metrics block 1010, and it further checks if the current error covariance is lower than the last error covariance P value saved. If the error covariance value is not the lowest P value, the processor acquires more data from the sensors at the next epoch 1055. If the error covariance is the lowest P value, then the processor proceeds to block 1050 to check if the angle has the lowest standard deviation at block 1050. If the standard deviation of Kalman Filter misalignment angle is less than a given threshold, the process proceeds to the calculation final result block 1060. However, if the misalignment angle does not have the lowest standard deviation, then the processor acquires more data from the sensors at the next epoch 1055.

If the current Kalman Filter output, angle and error covariance all qualify in the previous step, the angle value is stored in a separate buffer 1065 of the calculation final result block 1060. The angle and error covariance values are only stored in the buffer if they meet the criteria in the validity check block 1030. Any angle or error covariance that fails to meet the criteria in the validity check block 1030 will be discarded. If the total sample of angles and error covariance values accumulated in the buffer are more than a given threshold value N and it is determined to be full at block 1065, the means and standard deviation is calculated at block 1080. In one or more embodiments, the threshold value N may be determined based on the level of precision. For example, as previously mentioned, if the final output of the misalignment angle is expected to have an accuracy that deviates less than 2 degrees from the actual angle, the threshold value may be calculated based on N number of samples, but if the accuracy is to be less than 1 degrees, the number of samples of the threshold value may be a number that is greater than N number of samples. If the buffer is not full, the buffer is updated at block 1070. The misalignment angle and the error covariance may be received from the next epoch 1075 to update the data. In some embodiments, selected angle samples from the updated buffer may be inputted to the mean and standard deviation calculation block 1080. The mean and standard deviation calculation block 1080 computes the standard deviation of misalignment angle value stored in the buffer. Based on the calculation of the mean and standard deviation, if the produced angle is stable then the block proceeds to block 1090 to conclude that the alignment is complete. Here, if the angle is stable, the standard deviation value should be small. When the calculation final result block 1060 concludes that the alignment is complete, it outputs the result at block 1095. In one embodiment, the output at the result block 1095 includes the current time, an average of the misalignment angle and the standard deviation of the misalignment angle stored in the buffer.

While various applications can be made based on the present disclosure, one exemplary application of the present disclosure according to one or more embodiments is the device 120 communicating the results of the dead reckoning to another electronic device. The device 120 may include modem chips, network and communication chips, or any suitable semiconductor chips capable of transmitting and receiving data. The device 120 may also communicate based on various communication protocols, including Wi-Fi™, Bluetooth™ Zigbee™, NFC™, cellular (e.g., 4G, 5G, LTE) etc. In one application, the device 120 may relay the path information of the vehicle calculated based on the misalignment angle to a first device, for example, the vehicle driver's electronic device. Once the vehicle driver's electronic device receive the information, the same path information of the vehicle can be relayed to another user trying to locate the vehicle or the vehicle driver.

In a similar application, the device 120 may relay the path information of the vehicle calculated based on the misalignment angle to a second device, for example, a user's electronic device who wants an update location of the vehicle. The device 120 may directly send the path information of the vehicle to the user so that the user may obtain the position information of the vehicle.

In other applications, the device 120 may be incorporated to any devices within the vehicle. For example, the device 120 does not necessarily have to be a separate device and can be incorporated to any electronic devices within the vehicle such as navigation devices, vehicle black boxes, or other devices.

In further applications, the device 120 may be incorporated into the vehicle driver's electronic device. In yet further applications, the device 120 may be a standalone device that incorporates a chipset module, a receiver module or the like. In this application, the standalone device 120 can be installed in any orientation. The algorithm based on the present disclosure provides automatic correction of misalignment of the sensor of the device with respect to the reference frame of the vehicle. This provides great flexibility in that the device 120 does not have to be fixed in a specific orientation or at a specific location. That is, factory calibration to compensate or mitigate misalignment angle between the vehicle frame and the sensor frame is not necessary.

In one or more embodiments, the algorithm according to the present disclosure will operate reliably under GPS/GNSS signal absent environments. For example, a device 120 embodying the algorithm according to the present disclosure will be able to operate and track the path and position of the device 120 in less than 10 seconds after the GPS/GNSS signals become weak or lost.

In one or more embodiments, the algorithm according to the present disclosure will produce an accurate misalignment angle that has an error that deviates less than 2 degrees from the actual misalignment angle.

In other embodiments, the stand-alone device and related sensor data may be used to evaluate a collision between vehicles. The stand-alone device may be included in autonomous vehicles and human-operated vehicles, such as on the dash board or some other position selected by the driver or other party. This device is fixed with respect to the car during normal operation and will collect data before, during and after a collision. The accurate sensor alignment with respect to the vehicle reference frame assists in effectively analyzing crashes. For example, once a collision between vehicles has occurred, the aligned sensor data can be used to analyze the collision and to learn more about the circumstances surrounding the collision. The aligned sensor data is stored, such as in a memory in the device or in a remote server. Upon retrieval of this recorded data, the crash or collision can be analyzed. The misalignment angle between the sensor of the device and the vehicle reference frame and other data collected during the collision, is available even under circumstances where the GPS/GNSS signals are degraded or lost.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
sensing motions of a vehicle and a device on the vehicle by a plurality of sensors in the device, the plurality of sensors including a first sensor and a second sensor different from the first sensor, the device being fixed with respect to the vehicle;
determining an acceleration of the device by analyzing sensor data of the first sensor, the acceleration of the device having a first acceleration component in a first direction and a second acceleration component in a second direction, the second direction being perpendicular to the first direction;
determining an acceleration of the vehicle by analyzing sensor data of the second sensor, the acceleration of the vehicle having a first horizontal acceleration direction and a second horizontal acceleration direction, the second horizontal acceleration direction being perpendicular to the first horizontal acceleration direction;
determining a motion status of the vehicle that includes whether the vehicle is in a status of moving in a straight line or in a status of making a turn;
extracting horizontal components of the acceleration of the device from the first acceleration component; and
calculating a misalignment angle between a horizontal component of the first acceleration component and the first horizontal acceleration direction by analyzing an amount of rotation between the horizontal component of the first acceleration component of the device and the first horizontal acceleration direction of the vehicle and based on the motion status of the vehicle, the calculating of the misalignment angle including:
applying a singular value decomposition to the horizontal components of the acceleration of the device;
applying an orthogonal transformation to the horizontal components of the acceleration of the device and the acceleration of the vehicle;
calculating predicted horizontal components of acceleration of the vehicle by analyzing the sensor data of the second sensor;
determining error between the horizontal components of the acceleration of the device and the predicted horizontal components of the acceleration of the vehicle; and
calculating the misalignment angle based on the singular value decomposition, the orthogonal transformation, and the error; and
positioning the vehicle using the sensor data of the first sensors based on the misalignment angle.

2. The method of claim 1, wherein the first sensor of the plurality of sensors includes a three axis gyroscope and a three axis accelerometer.

3. The method of claim 2, wherein the second sensor of the plurality of sensors includes a global positioning system sensor.

4. The method of claim 1, wherein the first acceleration component in the first direction of the device is indicative of a forward axis of the plurality of sensors, the second acceleration component in the second direction of the device is indicative of a lateral axis of the plurality of sensors.

5. The method of claim 1, wherein extracting horizontal components of the acceleration of the device includes:
receiving a tilt direction of the first sensor of the plurality of sensors with respect to a horizontal plane; and
compensating the tilt direction to the first acceleration component and the second acceleration component to extract the horizontal components of the acceleration of the device.

6. A method, comprising:
receiving sensor data using a plurality of sensors in a device temporarily fixed with respect to a vehicle, the plurality of sensors including a motion sensor and a positioning sensor;
determining an acceleration of the device by analyzing sensor data detected by the motion sensor, the acceleration of the device having a first acceleration component in a first direction and a second acceleration component in a second direction, the second direction being perpendicular to the first direction;
determining an acceleration of the vehicle by analyzing sensor data of the positioning sensor, the acceleration of the vehicle having a first horizontal acceleration direction and a second horizontal acceleration direction, the second horizontal acceleration direction being perpendicular to the first horizontal acceleration direction;
determining a motion status of the vehicle that includes whether the vehicle is in a status of moving in a straight line or in a status of making a turn;
receiving a tilt direction of the device detected by the motion sensor with respect to a horizontal plane;
compensating the first acceleration component and the second acceleration component based on the tilt direction;
extracting horizontal components of the acceleration of the device from the first acceleration component and the second acceleration component; and
calculating a misalignment angle between a horizontal component of the first acceleration component and the first horizontal acceleration direction by analyzing an amount of rotation between the horizontal component of the first acceleration component of the device and the first horizontal acceleration direction of the vehicle and based on the motion status of the vehicle, the calculating of the misalignment angle including:
applying a singular value decomposition to the horizontal components of the acceleration of the device;

applying an orthogonal transformation to the horizontal components of the acceleration of the device and the acceleration of the vehicle;

calculating predicted horizontal components of acceleration of the vehicle by analyzing sensor data of the positioning sensor;

determining error between the horizontal components of the acceleration of the device and the predicted horizontal components of the acceleration of the vehicle; and calculating the misalignment angle based on the singular value decomposition, the orthogonal transformation, and the error; and positioning the vehicle using the sensor data of the motion sensor based on the misalignment angle.

7. The method of claim 6, further comprising:

applying cross-correlation to horizontal acceleration components of the device and the vehicle, and horizontal components of the device and the vehicle calculated using the positioning sensor;

determining the orthogonal transformation, the orthogonal transformation minimizing the cross-correlation.

8. The method of claim 7, further comprising:

calculating the predicted horizontal components of acceleration of the vehicle using a prediction filter;

applying a direction cosine matrix to the predicted horizontal components of acceleration of the vehicle and the first and second acceleration components of the device;

determining error between the predicted horizontal acceleration components of the vehicle and the first and second acceleration components of the device, outputting an angle with minimized error between the predicted horizontal components of acceleration of the vehicle and the first and second acceleration components of the device.

9. The method of claim 8, wherein the prediction filter is a Kalman Filter.

10. A device, comprising:

a plurality of sensors configured to sense a motion of a vehicle and a motion of the device on the vehicle, the plurality of sensors including a first sensor and a second sensor different from the first sensor;

a processor, the processor receiving sensor data from the plurality of sensors; and the processor, in operation, capable of:

receiving the sensor data sensed by the plurality of sensors;

analyzing sensor data of the first sensor to determine an acceleration of the device, the acceleration of the device having a first acceleration component in a first direction and a second acceleration component in a second direction, the second direction being perpendicular to the first direction;

determining a motion status of the vehicle that includes whether the vehicle is in a status of moving in a straight line or in a status of making a turn;

analyzing sensor data of the second sensor to determine an acceleration of a vehicle associated with the device, the acceleration of the vehicle having a first horizontal acceleration direction and a second horizontal acceleration direction, the second horizontal acceleration direction being perpendicular to the first horizontal acceleration direction;

extracting horizontal components of the acceleration of the device from the first acceleration component and the second acceleration component of the device;

determining an angle formed between a horizontal component of the first acceleration component and the first horizontal acceleration direction based on an amount of rotation between the horizontal component of the first acceleration component of the device and the first horizontal acceleration direction of the vehicle and based on the motion status of the vehicle, the determining of the angle including:

applying a singular value decomposition to the horizontal components of the acceleration of the device;

applying an orthogonal transformation to the horizontal components of the acceleration of the device and the acceleration of the vehicle;

calculating predicted horizontal components of acceleration of the vehicle by analyzing the sensor data of the second sensor;

determining error between the horizontal components of the acceleration of the device and the predicted horizontal components of the acceleration of the vehicle; and determining the angle based on the singular value decomposition, the orthogonal transformation, and the error; and positioning the vehicle using the sensor data of the first sensors based on the angle.

11. A chipset, comprising:

a processor, in operation, communicatively coupled to a plurality of sensors, the plurality of sensors including a first sensor and a second sensor different from the first sensor, the processor capable of:

receiving sensor data from the plurality of sensors coupled to the processor in the chipset;

analyzing sensor data of the first sensor to determine an acceleration of the chipset, the acceleration of the chipset having a first acceleration component in a first direction and a second acceleration component in a second direction, the second direction being perpendicular to the first direction;

analyzing sensor data of the second sensor to determine an acceleration of a vehicle associated with the chipset, the acceleration of the vehicle having a first horizontal acceleration direction and a second horizontal acceleration direction, the second horizontal acceleration direction being perpendicular to the first horizontal acceleration direction;

determining a motion status of the vehicle that includes whether the vehicle is in a status of moving in a straight line or in a status of making a turn;

extracting horizontal components of the acceleration of the chipset from the first acceleration component in the first direction and the second acceleration component in the second direction;

determining an angle formed between a horizontal component of the first acceleration component of the chipset and the first horizontal acceleration direction of the vehicle based on an amount of rotation between the horizontal component of the first acceleration component of the chipset and the first horizontal acceleration direction of the vehicle and based on the motion status of the vehicle, the determining of the angle including:

applying a singular value decomposition to the horizontal components of the acceleration of the chipset;

applying an orthogonal transformation to the horizontal components of the acceleration of the chipset and the acceleration of the vehicle;
calculating predicted horizontal components of acceleration of the vehicle by analyzing the sensor data of the second sensor;
determining error between the horizontal components of the acceleration of the chipset and the predicted horizontal components of the acceleration of the vehicle; and
determining the angle based on the singular value decomposition, the orthogonal transformation, and the error; and
positioning the vehicle using the sensor data of the first sensors based on the angle.

12. The chipset of claim 11, wherein the chipset is included in an electronic device.

13. The device of claim 10, wherein the first sensor of the plurality of sensors includes a three axis gyroscope and a three axis accelerometer.

14. The device of claim 10, wherein the second sensor of the plurality of sensors includes a global positioning system sensor.

15. The chipset of claim 11, wherein the first acceleration component in the first direction of the chipset is indicative of a forward axis of the plurality of sensors, the second acceleration component in the second direction of the chipset is indicative of a lateral axis of the plurality of sensors.

16. The chipset of claim 11, wherein extracting horizontal components of the acceleration of the chipset includes:
receiving a tilt direction of the first sensor of the plurality of sensors with respect to a horizontal plane; and
compensating the tilt direction to the first acceleration component and the second acceleration component to extract the horizontal components of the acceleration of the chipset.

* * * * *